United States Patent [19]

Suzuki

[11] Patent Number: 4,813,810
[45] Date of Patent: Mar. 21, 1989

[54] REMOVABLE COUPLING DEVICE

[75] Inventor: Tsunehiko Suzuki, Tokyo, Japan

[73] Assignee: Matsui Walterscheid Ltd., Tokyo, Japan

[21] Appl. No.: 935,984

[22] Filed: Nov. 28, 1986

[30] Foreign Application Priority Data

Nov. 27, 1985 [JP] Japan ................................ 60-265058
Dec. 13, 1985 [JP] Japan ................................ 60-279156
Aug. 26, 1986 [JP] Japan ................................ 61-198259

[51] Int. Cl.$^4$ .............................................. B25G 3/18
[52] U.S. Cl. .................................... 403/322; 403/325; 403/327
[58] Field of Search ................... 285/315, 316, 277; 403/321, 322, 325, 326, 327, 143, DIG. 7

[56] References Cited

U.S. PATENT DOCUMENTS

| | | | |
|---|---|---|---|
| 2,192,844 | 3/1940 | Bean | 403/322 |
| 2,521,701 | 9/1950 | Earle et al. | 285/315 X |
| 2,565,572 | 8/1951 | Pangborn | 285/316 X |
| 3,279,835 | 10/1966 | Krohm | 403/326 |
| 3,747,966 | 7/1973 | Wilkes et al. | 403/322 X |
| 3,817,560 | 6/1974 | Guertin | 285/277 X |
| 4,068,869 | 1/1978 | Maruyama | 285/316 |
| 4,318,630 | 3/1982 | Herchenbach et al. | 403/322 |
| 4,485,845 | 12/1984 | Brady | 137/614.04 |
| 4,579,476 | 4/1987 | Post | 403/322 |
| 4,601,603 | 7/1986 | Nakayama | 403/143 |
| 4,639,162 | 1/1987 | Geisthoff et al. | 403/325 X |
| 4,639,163 | 1/1987 | Buthe et al. | 403/322 |
| 4,641,990 | 2/1987 | Geisthoff | 403/322 X |
| 4,645,372 | 2/1987 | Suzuki | 403/322 X |

FOREIGN PATENT DOCUMENTS

| | | |
|---|---|---|
| 2853962 | 12/1978 | Fed. Rep. of Germany . |
| 3022239 | 6/1980 | Fed. Rep. of Germany . |
| 3120367 | 5/1981 | Fed. Rep. of Germany . |
| 3511577 | 10/1986 | Fed. Rep. of Germany . |
| 579838 | 5/1944 | United Kingdom . |
| 2041134 | 9/1980 | United Kingdom . |
| 2074684 | 11/1981 | United Kingdom . |

OTHER PUBLICATIONS

Patent Abstracts of Japan, vol. 10, No. 196, (M-497), (2252), 10th Jul. 1986; & JP-A-61-41 017, Matsui Warutaa Shiyaido K.K., 27-02-1986.
Patent Abstracts of Japan, vol. 10, No. 211, (M-501), (2267), 24th Jul. 1986; & JP-A 61-52 420, Matsui Warutaa Shiyaido K.K. 15-03-1986.

Primary Examiner—Andrew V Kundrat
Attorney, Agent, or Firm—Sughrue, Mion, Zinn, Macpeak & Seas

[57] ABSTRACT

A coupling device in which a shaft or pipe is coupled to a boss member in which balls, disposed in radial holes in the boss, engage a groove on the shaft or pipe. A set ring slidable on the boss selectively forces engagement of the balls with the groove. The set ring is biased in both direction toward the apertures. The bias can be provided by one or two spring rings engaging two oppositely inclined surfaces on either the boss or the set ring or by a coil spring set between two spring supports that are each moved by both the boss and the set ring.

41 Claims, 22 Drawing Sheets

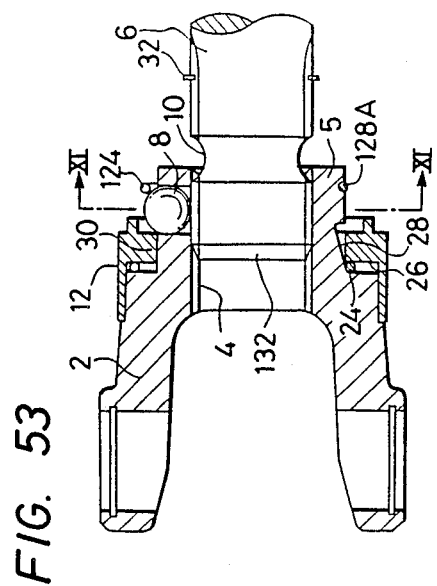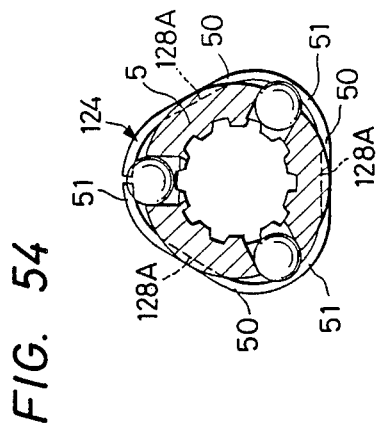

REMOVABLE COUPLING DEVICE

FIELD OF THE INVENTION

The present invention relates to a removable coupling device. More particularly, the invention relates to a removable coupling device comprising a shaft with a circumferential groove which is engagable with a hole of a boss which has locking elements locking the circumferential groove.

BACKGROUND OF THE INVENTION

A removable coupling device, of the type discussed here, comprises a boss member having a hole axially extending inwards and radially extending apertures opening in the hole. A shaft having a set groove circumferentially extending in an outer surface thereof is fitted into the hole of the boss member. Radially movable locking elements are disposed within the respective apertures such that the locking elements can be located at one of a locked position where the locking elements can partly extend inwards from the apertures so as to engage with the set groove of the shaft and can also be located at a connectable and disconnectable position where the locking elements are disengaged from the set groove. An axially movable set ring is disposed on the boss member. The set ring is axially urged by spring force so as to normally keep the locking elements at the locked position.

Coupling devices of the type described above have an advantage in that, when the shaft is inserted into the boss member, the shaft can be automatically kept at the locked position if the boss member is moved together with the joint yoke while trying to insert the shaft into the hole of the boss member under the condition that the set ring on the boss member is held by hand and moved in the direction opposite to the direction of insertion. An additional advantage is that, when the boss member is removed from the shaft, the boss member can be removed from the shaft similarly only by moving the boss member axially so as to separate it from the shaft under the condition that the set ring is held by hand and moved in the same direction as the direction of removal of the boss member. Accordingly, for example, in the case where the device of this type is used at an output shaft of a tractor for driving an agricultural machine to be connected to the tractor, the device is useful for connecting the output shaft of the tractor to a boss member having a universal joint yoke connected to the agricultural machine. On the other hand, in the case where a tractor merely pulls a car or the like, a shaft of the tractor can be removably connected to a shaft of the car. Furthermore, the device can be used for speedily connecting and disconnecting pipes, such as fire hoses or the like.

Although shafts for transmitting rotational motive power are used in various kinds of machines, the shafts are difficult to handle in connecting and disconnecting operations and often cause danger because the joint portion thereof is generally disposed at a narrow portion and/or because covers are provided to prevent stain. Furthermore, speedy connection and disconnection should be required for fire hoses or the like. In order to solve such problems, various kinds of devices for safely, securely and speedily performing the connection of the shafts have been proposed. Among those proposals, such a coupling device as described above in the introduction, in which the connection and disconnection is connection of the shaft can be easily made by axially moving the set ring when the shaft is inserted into or removed from the boss member, has been proposed in the specification and drawings initially appended to the request of an application of each of Japanese Patent Unexamined Publication Nos. 41017/1986, 52420/1986 and 84410/1986 and Japanese Patent Application No. 118949/1985 (corresponding to U.S. patent application Ser. No. 779,268 filed Sept. 23, 1985) now U.S. Pat. No. 4,645,372.

However, those proposed devices are disadvantageous in the following points. Many parts are required. The structure is complex. A long time is required for assembling the coupling device. Particularly, almost of those devices are disadvantageous in that it is necessary to search the current position of the shaft by feeling while holding the set ring by both hands and moving the set ring frontwards. It is also necessary to move the boss member together with the universal joint to push the boss member against the shaft so as to insert the shaft into the hole of the boss member. Accordingly, the proposed devices are difficult to handle in connecting and disconnecting operations and are not fully satisfactory, and improvement thereof has been expected.

SUMMARY OF THE INVENTION

It is therefore an object of the present invention to provide a reliable removable coupling device in which the connection and disconnection of the shaft can be made by a simple operation of axially moving the set ring in the same direction as the shaft, and in which the parts can be reduced in number and the structure can be simplified to thereby perform the connection and disconnection of the shaft safely, securely and speedily.

The invention can be summarized as a coupling device in which a shaft or pipe is coupled to a boss member in which balls, disposed in radial holes in the boss, engage a groove on the shaft or pipe. A set ring slidable on the boss selectively forces engagement of the balls with the groove. The set ring is biased in both direction toward the apertures. The bias can be provided by one or two spring rings engaging two oppositely inclined surfaces on either the boss or the set ring or by a coil spring set between two spring supports that are each moved by both the boss and the set ring.

BRIEF DESCRIPTION OF THE DRAWINGS

FIGS. 1 to 6 show a first embodiment of the coupling device according to the invention, in which FIG. 1 is a longitudinal sectional view of the device, FIG. 2 is a cross-sectional view taken along the line I—I of FIG. 1, FIG. 3 is a view showing a spring ring, and FIGS. 4 to 6 are views for explaining the steps of operation.

FIG. 31 being a cross-sectional view taken along the line III—III of FIG. 30, FIG. 32 being a view when viewed from the arrow Z in FIG. 31.

FIGS. 50 and 51 are views showing a modification based on FIGS. 46 and 47.

FIGS. 52 to 54 are views showing a modification of FIGS. 1 to 6 in which the inclined surfaces are formed on one-side.

DETAILED DESCRIPTION OF THE PREFERRED EMBODIMENTS

Figure 1:
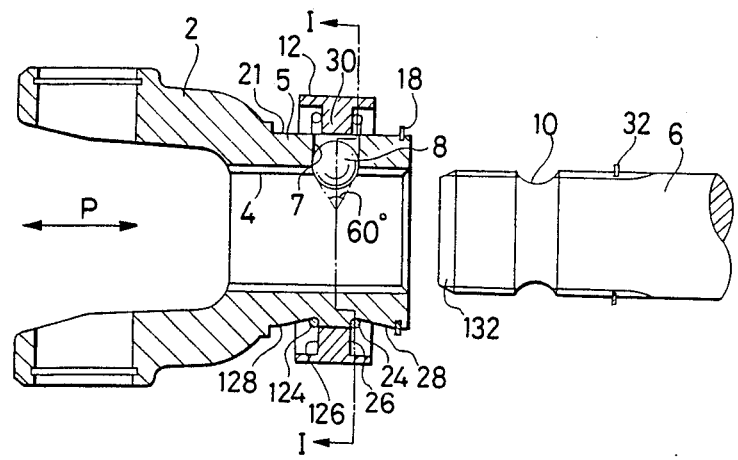

According to the present invention, the above object and other objects can be attained by the coupling device of the type as described above and arranged such that two kinds of independent inclined surfaces are formed on an outer surface of the boss member or on an inner or outer surface of the set ring so as to increase a diameter of the boss member or of the set ring as the inclined surfaces extend axially. Furthermore, two spring rings are provided so as to partially abut on the set ring having no inclined surface or partially abut on side surfaces of a protrusion. A flange or a stopper is formed on the boss member. The two spring rings are in forced contact with the respective inclined surfaces respectively. Thereby, if a connection and disconnection operation is performed while moving the set ring in the same direction as the direction of moving the boss member (that is, while pushing the set ring in the direction to urge the boss member against the shaft in the case of insertion and while pulling the set ring in the direction to draw the boss member from the shaft in the case of removal), one of the spring rings slides on the inclined surfaces so that the set ring is automatically returned from the connectable and disconnectable position to the locked position when the shaft is inserted into or removed from the hole of the boss member.

Furthermore, according to a second aspect of the invention, the foregoing object can be attained by such an arrangement that inclined surfaces are formed on an outer surface of the boss member or on an inner or outer surface of the set ring such that each of the inclined surfaces has two inclined surface portions connected to each other at a minimum or maximum diameter portion so that the diameter is increased or decreased as the two inclined surface portions extend toward opposite ends from the minimum or maximum diameter portion. Futhermore, a spring ring is provided so as to partially engage with a groove formed in an inner surface of the set ring having no inclined surface or formed in an outer or inner surface of the boss member. The spring ring is in forced contact with the inclined surface, whereby, if a connection and disconnection operation is performed while moving the set ring in the same direction as the direction of moving the boss member, the spring ring slides on the inclined surfaces so that the set ring is automatically returned from the connectable and disconnectable position to the locked position when the shaft is inserted into or removed from the hole of the boss member.

Moreover, according to a third aspect of the invention, the foregoing object can be attained by such an arrangement that a compression coiled spring is made to be in contact at its one end with a spring support and at its other end with another spring support so that the compression coiled spring urges the set ring in the axial direction of the boss member through the spring supports. Also, stoppers are formed on the outer surface of the boss member so as to respectively engage with the spring supports so that the compression coiled spring can be compressed to decrease the spring length at the locked position but cannot be spread beyond the spring length. Flanges are formed on the set ring so as to respectively engage with the spring supports, the spring supports being arranged to be axially slidable on the boss member, the set ring being arranged to be axially slidable on the spring supports. Thereby, if a connection and disconnection operation is performdd while moving the set ring in the same direction as the direction of moving the boss member, the set ring is automatically returned from the connectable and disconnectable position to the locked position by the axially returning force of the compression coiled spring when the shaft is inserted into or removed from the hole of the boss member.

In the arrangement according to the first and second aspects of the invention, if the set ring is held by one hand and the spring ring, engaged with the inclined surfaces at the locked position by contracting or spreading force, is axially slid on the inclined surfaces so as to be spread or contracted against the axial component of force produced by a cam function owing to the engagement of the spring ring with the inclined surfaces, then a connectable and disconnectable position can be reached where the locking elements are enabled to move outwards. If the shaft is inserted into or drawn from the hole of the boss member, the locking elements are pressed by the shaft so as to move out of the set groove of the shaft. If the shaft is further inserted into or further drawn from the hole of the boss member, the spring ring slides down on the inclined surfaces by the cam function of the spring ring and reaches the end of the inclined surfaces so that the set ring carried by the spring ring is automatically returned to the lock position.

The coupling device according to the third aspect of the invention uses a combination of two spring supports and a compression coiled spring substituted for the combination of inclined surfaces and the spring ring used in the device according to the second aspect of the invention. In this arrangement, if the set ring is held by one hand and the set ring at the lock position is axially slid against the spring force of the compression coiled spring which is urging the set ring through the two spring supports, a connectable and disconnectable position where the locking elements can move outwards is reached. If the shaft is inserted into or drawn from the hole of the boss member in this state, the locking elements are pressed by the shaft to move out of the set groove of the shaft. If the shaft is further inserted into or further pulled from the hole of the boss member, the spring supports are returned to the positions where the spring supports abut on the stoppers by the return force of the compression coiled spring so that the set ring carried by the spring supports is automatically returned to the lock position.

Accordingly, in use, it is possible to perform connection and disconnection between the shaft and the boss member merely by moving the boss member under the condition that the set ring is held by hand and moved in the same direction as the direction of moving the boss member so that the shaft is inserted into or separated from the hole of the boss member. Furthermore, a large number of parts are not required and the structure is simple, so that the manufacturing and assembling of the coupling device can be simplified. The connection and disconnection of the shaft can be made safely, securely and speedily. In addition, when the boss member is moved to insert or remove the shaft into or from the hole of the boss member, the connecting and disconnecting operation can be made by moving the set ring in the same direction as the movement of the boss member. Accordingly, compared with the prior art device requiring the reverse operation, that is, the operation of moving the boss member while keeping the set ring in the state where the set ring has been moved in the direction opposite to the movement of the boss member, the device of the present invention requires nothing but such a simple operation and is excellent in view of human-factors engineering.

The removable coupling device according to the present invention will be described in reference to a case where the device is applied to connection between an output shaft of a tractor and a boss member of a universal joint coupled to an agricultural machine driven by the tractor, but the invention is not limited thereto. For example, the invention is applicable to various cases such as connection between fire hoses, connection between oil or air pipes of hydraulic or pneumatic appliances, and the like.

An embodiment according to a first aspect of the invention will be described in detail with reference to the drawings.

Referring to FIGS. 1 to 6, there is shown a removable coupling device for connecting a splined output shaft of a tractor to a boss member having an universal joint yoke to drive an agricultural machine coupled to the tractor through the universal joint. The coupling device includes, on the tractor side, a splined shaft 6. The coupling device includes, on the machine side, a boss member 5 provided with a joint yoke 2, a hole 4 extending axially for receiving the shaft 6 into the boss member 5, and three apertures 7 radially extending and opening into the hole 4. Locking elements or balls 8 are disposed within the respective apertures 7 and partially radially inwards radially inwards extend from the apertures so as to be engaged with a set groove 10 formed in the shaft 6 so that the shaft cannot be removed from the boss member. See FIG. 5 for the coupled position.

The boss member 5 is formed like a cylinder. Inclined surfaces 28 and 128 are formed independently of each other at each of three circumferentially equidistantly separated places on the outer surface of the boss member 5 such that the inclined surfaces 28 and 128 extend starting from positions corresponding to the opposite ends of the respective aperture 7. The inclined surfaces 28 and 128 extend axially and oppositely to each other so as to make the diameter of the boss member 5 gradually increase away from apertures 7. The boss member 5 may be formed like a polygonal pillar. The inclined surfaces 28 are circumferentially shifted in phase by about 60 degrees relative to the respective apertures 7. The length, the width and the taper angle of the respective inclined surface 28 can be suitably established in accordance with the conditions required.

Figure 2:
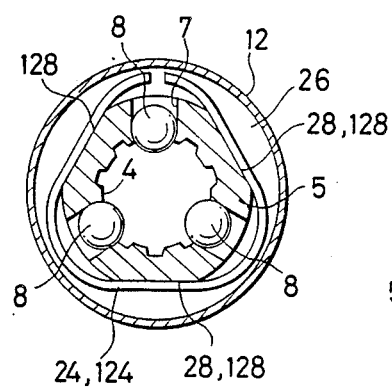
Figure 3:
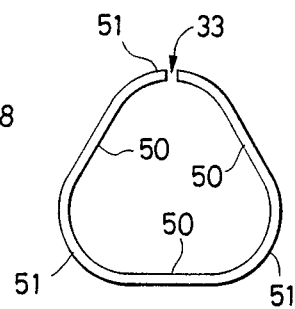

A set ring 12 is axially movable (in the direction shown by an arrow P in FIG. 1) on a cylindrical portion 21 of the boss member 5 and provided with a protrusion 30 for keeping the radially inwards extended balls 8 at locked positions. In order to keep the set ring 12 at the position shown in FIG. 1, two substantially triangular spring rings 24 and 124, shown in plan view in FIGS. 2 and 3, are disposed on the boss member 5, each of the springs 24 and 124 have a slit 33, flat portions 50 and corner portions 51 and have an inwards contracting force. The flat portions 50 of the spring rings 24 and 124 are in forced contact with the inclined surfaces 28 and 128 respectively. Other portions including the corner portions 51 of the spring rings 24 and 124 are in contact with respective opposite side surfaces 26 and 126 of the protrusion 30 of the set ring 12. Because each of the sprnng rings 24 and 124 has an inwards contracting force, the set ring 12 is pressed from its opposite sides by the axial component of force produced by the engagement of the spring rings 24 and 124 with the inclined surfaces 28 and 128, and is kept at the position shown in FIG. 1. The set ring 12 and the spring ring 24 are prevented from coming off from the boss member 5 by a stopper 18 provided at the outer end portion of the boss member 5.

FIG. 1 shows the condition that the splined shaft 6 is not yet inserted into the hole 4 of the boss member 5. In order to prevent the balls 8 from falling out of the respective apertures 7 into the splined hole 4 of the boss member 5 in this condition, the inner end of the respective aperture 7 for receiving the ball 8 is reduced in diameter such that, for example, an inner surface of a solid angle of 60 degrees is formed as shown in FIG. 1.

Figure 4:
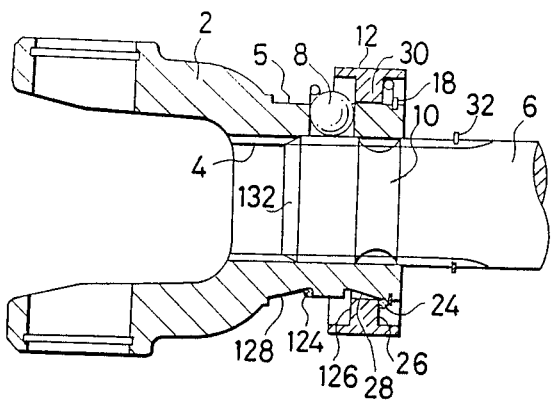

To insert the splined shaft 6 into the boss member 5, an attempt is made to fit the shaft 6 into the hole 4 of the boss member 5 while holding the set ring 12 by hand. The set ring 12 is pressed in the same direction as the moving direction of the boss member 5 so that the boss member 5 is moved together with the joint yoke 2. In other words, as shown in FIG. 4, the set ring 12 is moved toward the splined shaft, that is, rightwards in FIG. 1, against the axial component force produced by the engagement of the spring ring 24 with the inclined surface 28. In this situation, the protrusion 30 of the set ring 12 acting as stopper for the balls is far from the balls 8 so that the balls 8 can move radially outwards. If the splined shaft 6 is inserted in this situation, the splined shaft 6 can be inserted into the splined hole 4 because the balls 8 are pressed radially outwards owing to the cam function of a chamfered portion 132 formed at the forward end of the splined shaft 6. When the set ring 12 is in this connectable/removable position, the balls 8 are prevented from coming off radially outwards because the spring ring 124 is in its original position so that the corner portions 51 thereof are in contact with the balls 8. When the splined shaft 6 is more deeply inserted, the situation turns into such a state that if the holding of the set ring by hand is released, the set ring 12 is prevented from moving leftwards any more than a slight bit due to the return force of the spring ring 24, because the ball pressing protrusion 30 engages with the balls 8 pressed radially outwards by the splined shaft 6 as shown clearly in FIG. 4.

Figure 5:
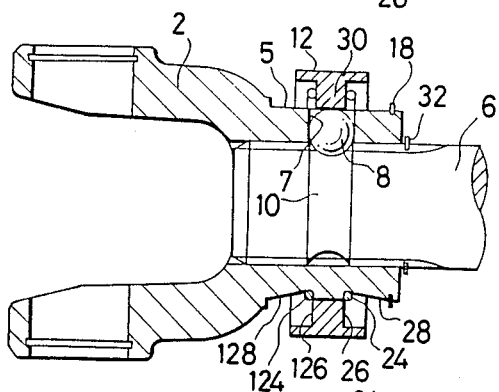
Figure 6:
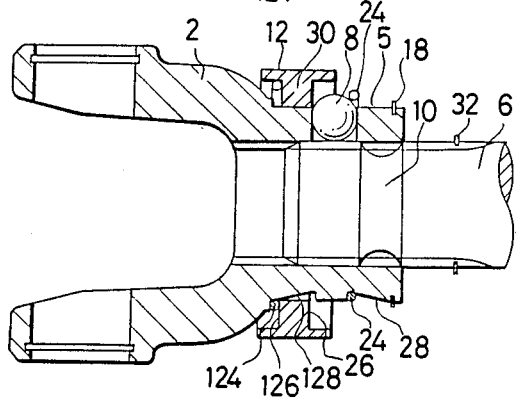

Referring to FIG. 5, there is shown the locked position where the balls 8 are fitted in the set groove 10 of the splined shaft 6 after the splined shaft 6 has been more deeply inserted while holding the set ring 12 by hand. The balls 8 are completely fitted in the set groove 10 of the splined shaft 6. Because the balls 8 are arranged to be movable inwards in such a manner as described above, the protrusion 30 of the set ring acting as a ball pressing stopper presses the balls 8 inwards by the return force of the spring ring 24, and the action of preventing the return of the set ring ceases so that the set ring 12 returns to the original position. Furthermore, in this case, the spring rings 24 and 124 slide to the lowermost portions of the inclined surfaces 28 and 128 respectively, so that the set ring 12 can be stably held. The protrusion 30 of the set ring 12 acting as a ball stopper is located radially outside of the balls 8 so as to prevent the balls 8 from coming off from the set groove 10 of the splined shaft 6, so that the splined shaft 6 is prevented from coming off and out of the hole 4 of the boss member 5.

At the time when the splined shaft 6 is required to be removed from the hole 4 of the boss member 5, the boss member 5 is moved together with the joint yoke 2 to separate the boss member 5 from the shaft 6 while holding the set ring by hand and pulling it in the direction of movement of the boss member. In this case, the set ring 12 is moved in the direction away from the splined shaft 6, that is, leftwards in FIGS. 1 and 6, against the axial component of force produced by the engagement of the spring ring 124 with the inclined surface 128. In this situation, the protrusion 30 of the set ring 12 acting as a ball stopper is far from the area of the apertures 7 so that, although the balls 8 can move radially outwards, they are prevented from dropping out because the spring ring 24 is at its original position. When the boss member 5 is pulled from the splined shaft 6 in this situation, the balls 8 are pushed radially outwards by the concave surface of the set groove 10 of the splined shaft 6. When the splined shaft 6 is further pulled, the balls 8 come out of the set groove 10 of the splined shaft 6 so that the shaft 6 can be completely removed from the hole 4 of the boss member 5. Thus, the balls 8 become movable radially inwards within the respective apertures 7 of the boss member 5. Accordingly, the protrusion 30 of the set ring 12 returns to the position shown in FIG. 1 while pressing the balls 8 radially inwards by the returning force of the spring ring 124.

FIG. 2 is a cross-sectional view taken along the line I—I of FIG. 1, and FIG. 3 is a detailed drawing of the spring rings 24 and 124. Although the number of the inclined surfaces 28 and 128 formed on the outer surface of the boss member 5, the shape of the spring rings engaged with the inclined surfaces, and the number of flat portions 50 are not limited to the illustrated embodiment, it is preferable to provide them at three places or more as shown in FIGS. 1 to 6 for the purpose of stability.

The spring rings 24 and 124 are annularly shaped and provide a spring force. Although each of the spring rings may be made double or more, it is preferable to make the respective ring single as shown in FIGS. 1 to 6 for the purpose of saving space.

Although the sectional form of each of the spring rings 24 and 124 may be freely designed, it is generally preferable to make the shape circular in view of the fact that the spring rings 24 and 124 should slide on the inclined surfaces 28 and 128.

The spring rings 24 and 124 may be made of a steel material, such as spring steel or the like, or an elastic organic material, such as Nylon or the like Although the shape of the respective ball 8 may be a polyhedron, such as a roller, an arched roller or the like, it is preferable to make the ball 8 spherical at its one end for the engagement with the ball set groove 10 of the splined shaft 6. The other end of the respective ball 8 may be shaped like a cylindrical pillar as long as it can be engaged with the ball-stopper protrusion or flange 30 of the set ring 12. However, it is the least inexpensive to use balls that are readily available on the market.

The respective ball 8 may be made of steel or may be made of a plastic material which is resistant against abrasion. Although the number of the balls 8 may be one or two, it is preferable to use three balls as illustrated in the aforementioned embodiment for the purpose of stability. For the stop ring 18, it is possible to use a snap ring available on the market. In order to limit the depth in insertion of the splined shaft 6, it is preferable also to provide a shaft stop ring 32 on the splined shaft 6.

Figure 7:
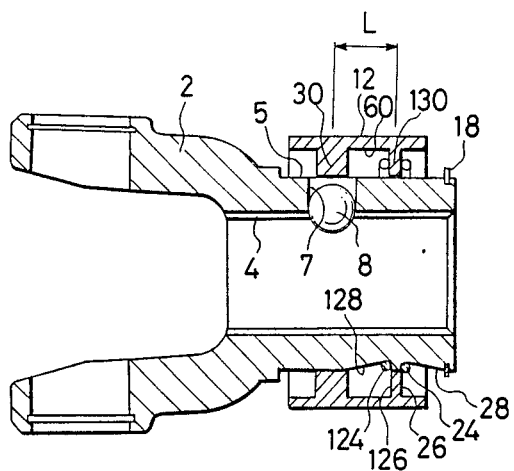
FIG. 7 is a view showing an embodiment in which the inclined surfaces are formed at a place different from the preceding case.

FIG. 7 shows another embodiment which is a modification of the previous embodiment shown in FIGS. 1 to 6 and which is different from the previous embodiment in that inclined surfaces 28 and 128 are disposed so as to be separated by an axial distance of L from the area of a radial plane at the center of the apertures 7. In this case, a set ring 12 is made to extend further axially. A flange portion 130 having opposite side surfaces 26 and 126 abutting against spring rings 24 and 124 is formed within a range of an extending portion of the set ring 12 to thereby form a recess 60 between a protrusion 30 and the flange portion 130 for receiving balls at the connectable/removable positions.

Figure 8:
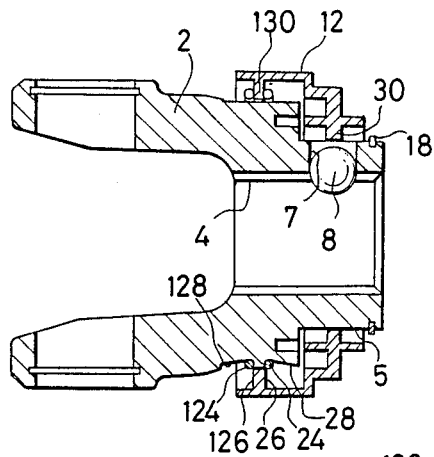
FIG. 8 is a view showing an embodiment in which the inclined surfaces are formed at a further different place.

FIG. 8 shows a further embodiment similar to the embodiment of FIG. 7. In this embodiment, inclined surfaces 28 and 128 are formed at a portion of the outer surface of a boss member 5 enlarged in diameter at a side of the joint yoke 2. A set ring 12 is similarly extended to the area of the inclined surfaces 28 and 128 and is provided with a flange portion 130 extending inwards between the inclined surfaces 28 and 128 so that spring rings 24 and 124 abut on opposite side surfaces 26 and 126 of the flange portion 130.

Figure 9:
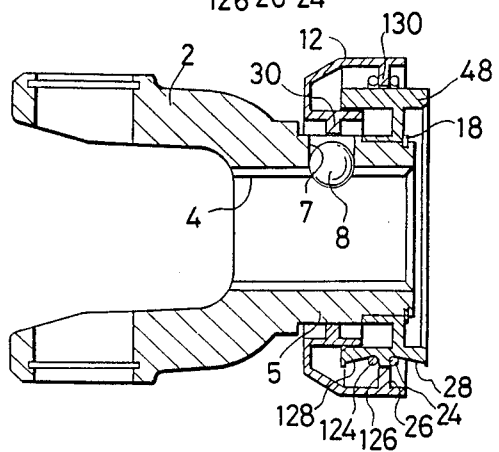
FIGS. 9 and 10 are views showing embodiments in which the inclined surfaces are formed on an annular member fixed to the boss member.
Figure 10:
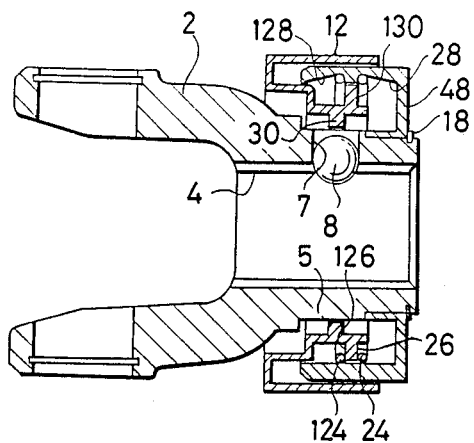

FIGS. 9 and 10 show other embodiments where inclined surfaces 28 and 128 are formed on an annular member 48 integrally attached to a boss member 5. As will be apparent in FIG. 9, the annular member 48 having a U-shaped section is fixed on a boss member 5 and the inclined surfaces 28 and 128 are formed on the cylindrical outer surface of the annular member 48. A set ring 12 is provided with a flange portion 130 extending radially inwards between the inclined surfaces 28 and 128 so that spring rings 24 and 124 abut on opposite side surfaces 26 and 126 of the flange portion 130. In the embodiment of FIG. 10, the inclined surfaces 28 and 128 are similarly formed on the inner surface of the annular member 48 but spring rings 24 and 124 have spreading force. Accordingly, in this embodiment, corner portions 51 of the spring rings are in forced contact with the inclined surfaces 28 and 128, and, on the other hand, other portions including flat portions 50 of the spring rings 24 and 124 abut on opposite side surfaces 26 and 126 of a flange portion 130 formed on a set ring 12. The spring rings used in FIGS. 7 to 10 have the same function as those shown in FIGS. 1 to 6. In short, those spring rings have contracting or spreading force, so that the spring rings 24 and 124 keep the set ring 12 in the axial direction through the flange portion 130 owing to the cam function of the flat portions 50 or the corner portions 51 sliding to the lowermost portions of the inclined surfaces 28 and 128. The advantage in the embodiments of FIGS. 9 and 10 is that no special working is required for forming the inclined surfaces on the boss member.

Figure 11:
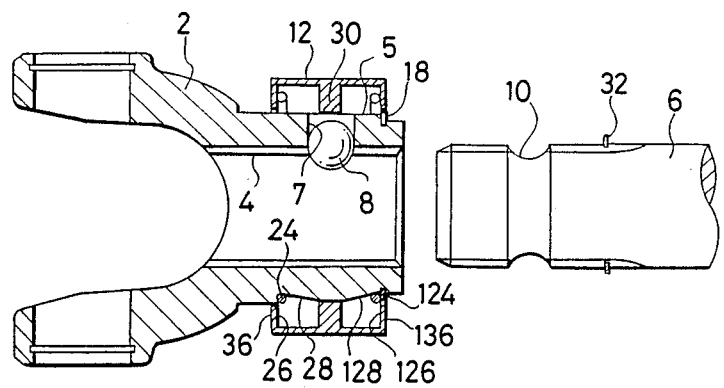
FIG. 11 is a view showing an embodiment in which the direction of the inclined surfaces is different from each other.

In an embodiment of the coupling device shown in FIG. 11, inclined surfaces 28 and 128 are formed on the outer surface of a boss member 5 independently of each other such that they are formed starting from the area of apertures 7 and extend axially from the apertures 7 so as to reduce the diameter of the boss member 5. The inclined surfaces 28 and 128 are respectively circumferentially shifted by an angle of about 60 degrees from the area of the apertures 7. Accordingly, the inclined surfaces are reversed in direction of inclination compared with the inclined surfaces shown in FIGS. 1 to 6. Spring rings 24 and 124 used in this embodiment are the same as those shown in FIG. 3 and are contracting. That is, the spring rings 24 and 124 are in forced contact at their flat portions 50 with the inclined surfaces 28 and 128 with contracting force. A set ring 12 has a ball-stopper protrusion 30 formed at its center and flanges 36 and 136 formed at its opposite ends, and has an E-shaped cross section. Having contracting force, the spring rings 24 and 124 have such a cam function that their flat portions 50 slide down on the inclined surfaces 28 and 128 to the lowermost portions of the inclined surfaces 28 and 128. Accordingly, portions in the vicinity of corner portions 51 of the respective spring rings 24 and 124 are in forced contact with side surfaces 26 and 126 of the respective flanges 36 and 136 of the set ring 12 so that the spring rings axially keep the set ring 12 at the locked position where the ball-stopper protrusion 30 of the set ring 12 is located on the apertures 7. The connecting and disconnecting operation is the same as that described above. That is to say, it is sufficient that the boss member 5 is inserted onto or removed form the shaft 6 while holding the set ring 12 by hand and displacing the set ring 12 to the right or left. After the completion of the connecting or disconnecting operation, the set ring 12 automatically returns to the locked position.

Figure 12:
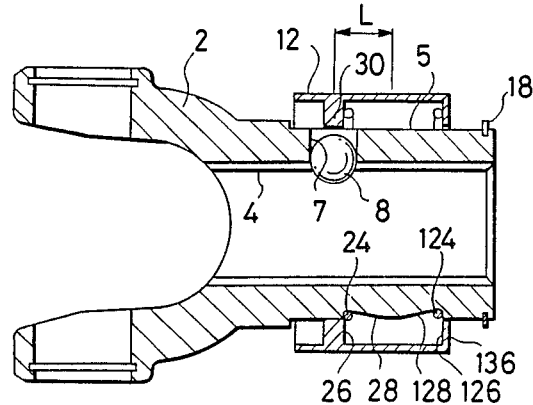
FIGS. 12 to 15 are views showing various embodiments in which the inclined surfaces is formed at different places.

FIGS. 12 to 15 show the coupling devices which are seen to be combinations of the embodiment of FIG. 11 with the respective embodiments of FIGS. 7 to 10. In reference to the position of the inclined surfaces, FIGS. 7 to 10 correspond to FIGS. 12 to 15 respectively. In FIG. 12, inclined surfaces 28 and 128 are formed on a boss member 5 at a portion separated by a distance L, from the area of a radial plane where the apertures 7 exist. Spring rings 24 and 124 respectively abut on a side surface 26 of a ball-stopper protrusion 30 and a side surface 126 of a flange 136 to thereby keep a set ring 12 at a locked position.

Figure 13:
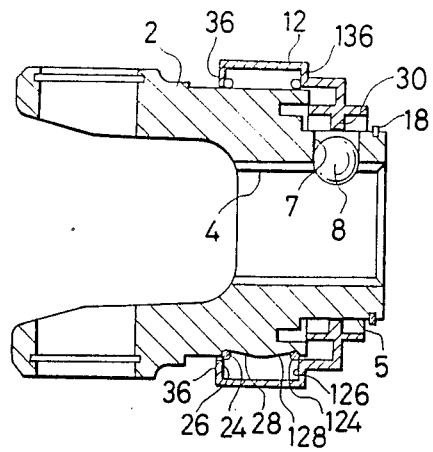

In FIG. 13, inclined surfaces 28 and 128 are formed on the outer surface of a boss member 5 at a joint yoke side where the diameter of the boss member is increased. A set ring 12 similarly extends to the area of the inclined surfaces and has flanges 36 and 136 formed at the end area of the inclined surfaces 28 and 128. Spring rings 24 and 124 are arranged to abut at their portions in the vicinity of corner portions 51 against respective side surfaces 26 and 126 of the flanges 36 and 136.

Figure 14:
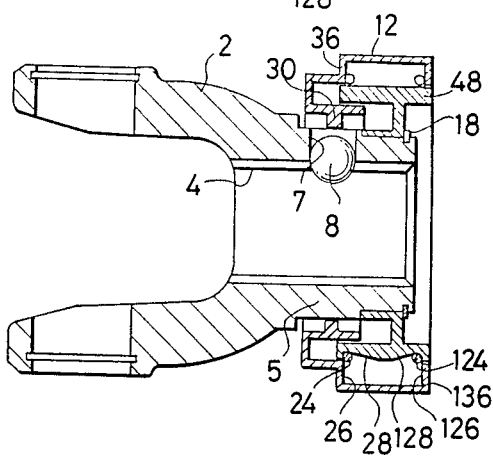

In FIG. 14, inclined surfaces 28 and 128 are formed on the outer surface of an annular member 48 integrally attached to a boss member 5. A set ring 12 similarly extends to the area of the inclined surfaces 28 and 128. Spring rings 24 and 124 have flat portions 50 and corner portions 51, the flat portions 50 being in forced contact with the inclined surfaces 28 and 128, and portions in the vicinity of the corner portions 51 abutting on respective side surfaces 26 and 126 of flanges 36 and 136 of the set ring 12, thereby keeping the set ring 12 at a locked position.

Figure 15:
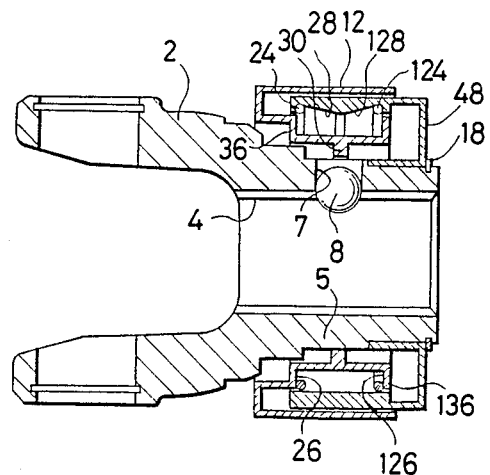

In the coupling device shown in FIG. 15, inclined surfaces 28 and 123 are similarly formed on the inner surface of an annular member 48 fixed to a boss member 5. Spring rings 24 and 124 have flat portions 50 and corner portions 51, the flat portions 50 being in forced contact with the inclined surfaces 28 and 128, and portions in the vicinity of the corner portions 51 abutting on respective side surfaces 26 and 126 of flanges 36 and 136 of the set ring 12, thereby keeping the set ring 12 at a locked position.

The connecting and disconnecting operation and function in the coupling devices shown in FIGS. 12 to 15 are the same as those described above, and therefore their description will be omitted.

Figure 16:
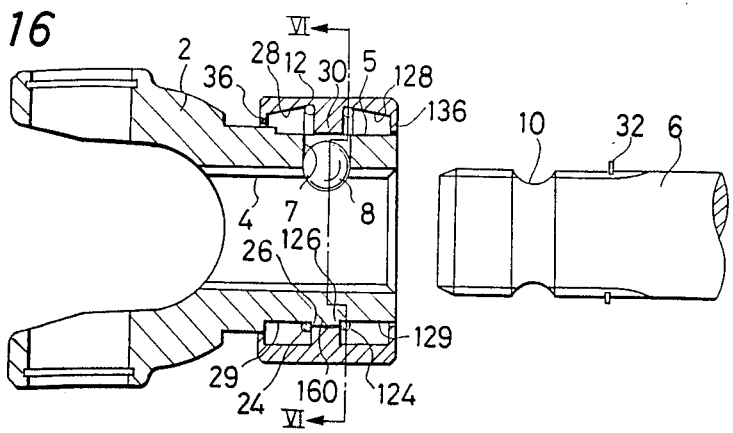
FIGS. 16 to 18 are views showing an embodiment in which the inclined surfaces are formed on the inner surface of the set ring.
Figure 17:
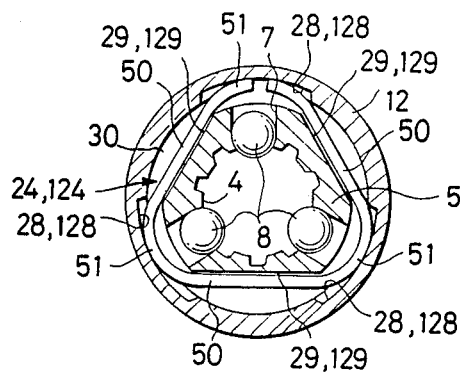
Figure 18:
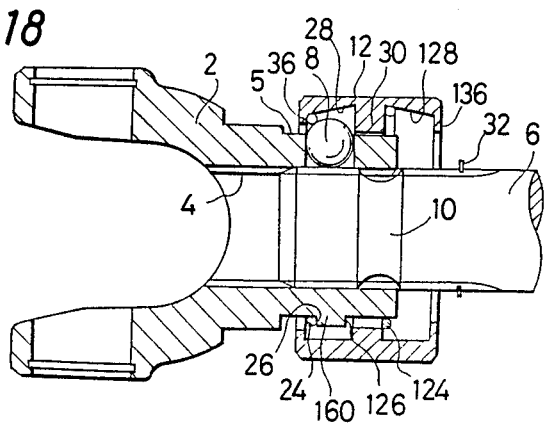

FIGS. 16 to 18 show embodiments where inclined surfaces 28 and 128 are formed on the inner surface of a set ring 12. On the inner surface of the set ring 12, the inclined surfaces 28 and 128 are formed in each of three circumferentially separated portions in the opposite outside areas of a radial plane along which apertures 7 exist such that the inclined surfaces 28 and 128 extend axially from the opposite sides of a ball-stopper protrusion 30 while reducing the inner diameter of the set ring 12. Substantially triangular spring rings 24 and 124 each having flat portions 50 and corner portions 51, as shown in FIG. 17, are disoosed to have a spreading force. On the outer surface of a boss member 5, there are provided at least one pair of cut surfaces (in this case, three pairs of cut surfaces) 29 and 129 for engaging with the flat portions 50 of the spring rings 24 and 124 to prevent the rotation of the springs. The cut surfaces 29 and 129 are circumferentially shifted by an angle of about 60 degrees relative to the apertures 7. A radially extending flange 160 is formed by the cut surfaces 29, and 129. The corner portions 51 of the spring rings 24 and 124 are in forced contact with the inclined surfaces 28 and 128 and the flat portions 50 of the spring rings 24 and 124 abut on opposite side surfaces 26 and 126 of the flange 160 to thereby axially keep the set ring 12 from its opposite sides at the locked position.

In connecting the boss member 5 to a shaft 6, similarly to the previously aforementioned embodiments, the set ring 12 is first held by hand and axially displaced to the position of FIG. 18 against the axial component of force of the spring ring 24. As a result, the spring ring 124 is axially carried because the protrusion 30 of the set ring 12 engages with the corner portion 51 of the spring ring 124. On the other hand, the spring ring 24 slides on the inclined surface 28 because the flat portion 50 of the spring ring 24 abuts on the side surface 26 of the flange 160 so that the spring ring 24 urges the flange 160 more strongly. In this condition, the hole of the boss member 5 is fitted onto the shaft 6 and is inserted onto the shaft 6. If the manual holding of the set ring 12 is released, the set ring 12 in this condition is not moved. When the boss member 5 is more deeply pushed to the shaft 6, the balls 8 are fitted into the set groove 10 and thereafter the spring ring 24 slides on the inclined surface 28 to thereby automatically return the set ring 12 to the lock position shown in FIG. 16. Thus, the connecting operation is completed.

Figure 19:
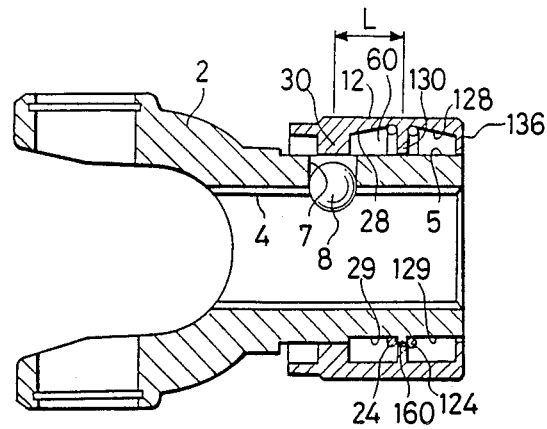
FIGS. 19 to 21 are views showing various embodiments in which the inclined surfaces are formed at different places on the set ring.
Figure 20:
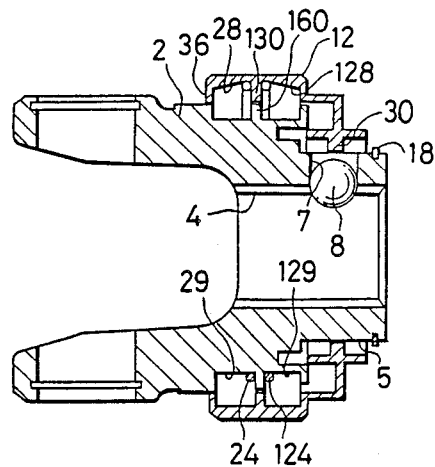
Figure 21:
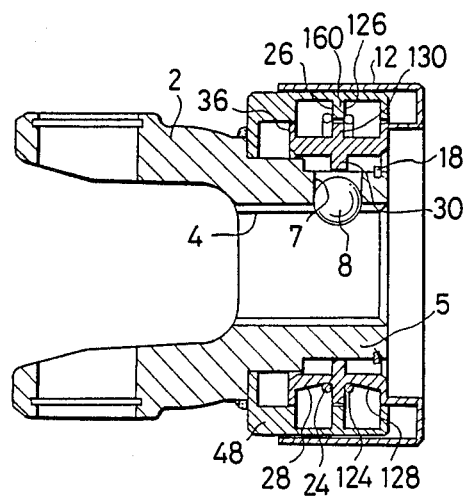

FIGS. 19 to 21 show coupling devices in which the inclined surfaces 28 and 128 are formed corresponding to those in the embodiments of FIGS. 7 to 8 and FIG. 10. The embodiment of FIG. 19 is different from the embodiments of FIGS. 16 to 18 only in the point that the inclined surfaces 28 and 128 are axially separated from the area of the apertures 7 by a distance L. Specifically, the set ring 12 is further extended axially by the distance L, and a flange 130 is formed on the inner surface of the set ring 12 at its extended portion so that portions in the vicinity of corner portions 51 of spring rings 24 and 124 abut on the flange 130. A recess 60 capable of receiving balls 8 is formed between a ball-stopper protrusion 30 and the flange 130. A flange 160 formed on the boss member 5 is also shifted axially by the distance L.

The embodiment of FIG. 20 is very similar to the embodiment of FIG. 19, but a set ring 12 is extended to the outer surface of a joint yoke 2 of the boss member 5 and inclined surfaces 28 and 128 are formed on the inner surface of the extended portion of the set ring 12. A flange 130 is formed inside the set ring 12 and a flange 160 is formed on the boss member 5. These flanges 130 and 160 are correspondingly formed in the same manner as in the previous embodiment.

In FIG. 21, inclined surfaces 28 and 128 are formed independently of each other on the outer surface of a set ring 12 and on the opposite sides of a flange 130 which is located at the radial outside of the area of apertures 7. The inclined surfaces 28 and 128 are inclined so as to reduce the diameter toward the central area of the apertures 7. Flat portions 50 of spring rings 24 and 124 are in forced contact with the inclined surfaces 28 and 128 and portions in the vicinity of corner portions 51 of the spring rings 24 and 124 abut on opposite side surfaces 26 and 126 of a flange 160 formed on the boss member 5. In this embodiment, the spring rings are provided with contracting force.

The connecting and disconnecting operation and the feature of the coupling devices shown in FIGS. 19 to 21 are the same as those described above and therefore their description will be omitted.

Figure 22:
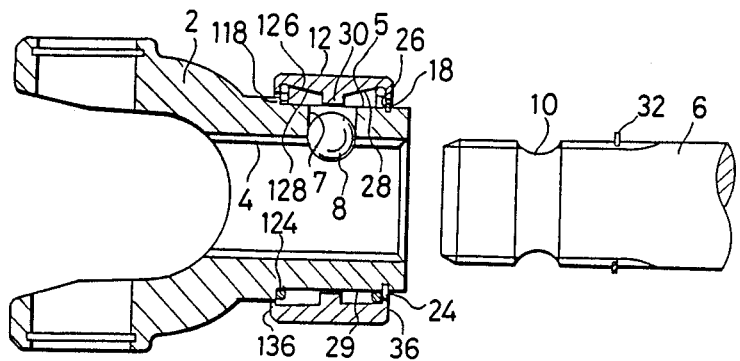
FIG. 22 is a view showing an embodiment in which the inclined surfaces are formed on the set ring and the direction the inclined surfaces is changed.

The coupling device of FIG. 22 is similar to those shown in FIGS. 16 to 18, and inclined surfaces 28 and 128 are formed at three circumferentially separated independent places on the inner surface of a set ring 12. However, the embodiment of FIG. 22 is different from those of FIGS. 16 to 18 in that the inclined surfaces extend axially from a ball-stopper protrusion 30 disposed near apertures 7 so as to gradually increase the diameter of the set ring 12. In other words, the direction of the inclined surfaces is reversed relative to that in the previous embodiments. In this embodiment, spring rings 24 and 124 have spreading force. Corner portions 51 of the spring rings 24 and 124 are in forced contact with the inclined surfaces 28 and 128 respectively. At least one of flat portions 50 of the spring rings 24 and 124 abuts against a cut surface 29 for preventing the spring rings from rotating and also abuts against respective side surfaces 26 and 126 of stoppers 18 and 118 to thereby hold the set ring 12 from its opposite sides at the locked position. If the set ring 12 is held by hand and moved right to the connectable and disconnectable position against the axial force component of the spring ring 24, the spring ring 124 is axially carried because a flange 136 of the set ring 12 engages with the corner portions 51. On the other hand, the corner portions 51 of the spring ring 24 are slid on the inclined surface 28 because the flat portion 50 of the spring ring 24 abuts on the side surface 26 of the stopper 18. As a result, the spring ring 24 urged more strongly to thereby be engaged with a protrusion 30 of the set ring 12. If under this condition, the boss member 5 is moved so as to insert the shaft 6 into the hole 4 of the boss member 5, the set ring 12 is automatically returned to the locked osition by the spreading force of the spring ring 24 when the balls 8 are received in the set groove 10 of the shaft 6.

Figure 23:
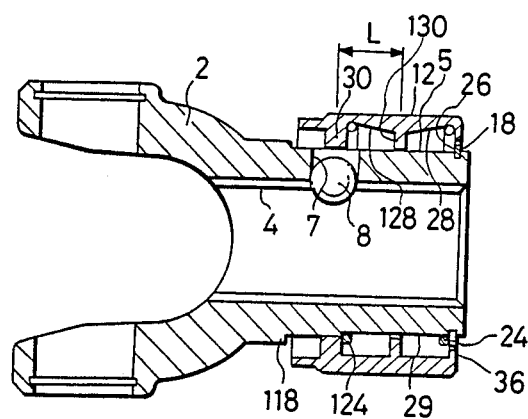
FIGS. 23 to 25 are views showing embodiments in which the inclined surfaces are formed in a different area.

FIG. 23 shows a modification of FIG. 22, which is obtained by shifting the inclined surfaces by a distance L from the area of the apertures 7 similarly to what was alone with the embodiments of FIGS. 7, 12 and 19. Other portions are arranged in the same manner as in the embodiment of FIG. 22.

Figure 24:
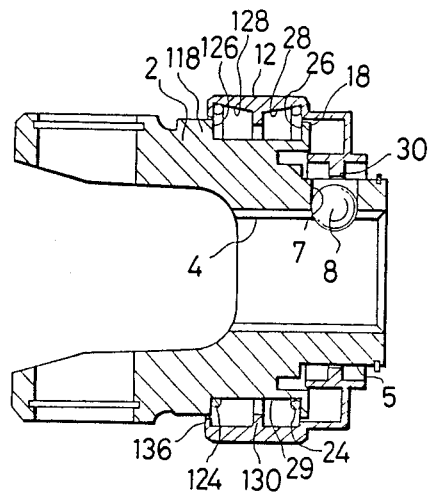

The coupling device of FIG. 24 is obtained by modifying the embodiment of FIG. 22 so as to make it similar to those shown in FIGS. 8, 13 and 20. That is to say, the set ring 12 is extended to the outer surface of a joint yoke 2 of a boss member 5. Inclined surfaces 28 and 128 like those shown in FIG. 22 are formed at the inner surface of the extended portion of the set ring 12. Cut surfaces 29 and stoppers 18 and 118 are similarly formed on the boss member 5.

Figure 25:
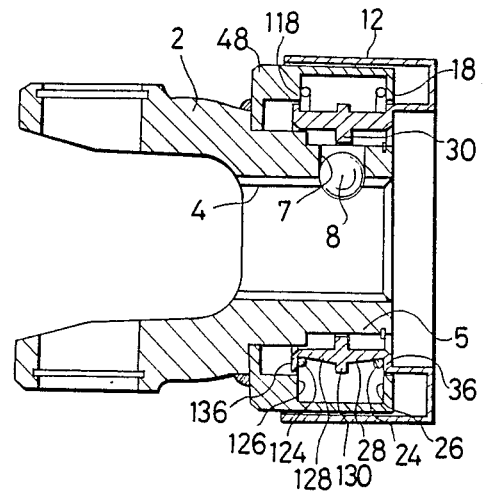

FIG. 25 is a modification of FIG. 22, in which inclined surfaces 28 and 128 are disposed on an outer surface of a set ring 12 corresponding to those shown in FIGS. 10, 15 and 21. In this embodiment, spring rings 24 and 124 have contracting force Flat portions 50 of the spring rings are in forced contact with the inclined surfaces 28 and 128. Corner portions 51 of the spring rings abut on respective side surfaces 26 and 126 of stoppers 18 and 118.

Figure 26:
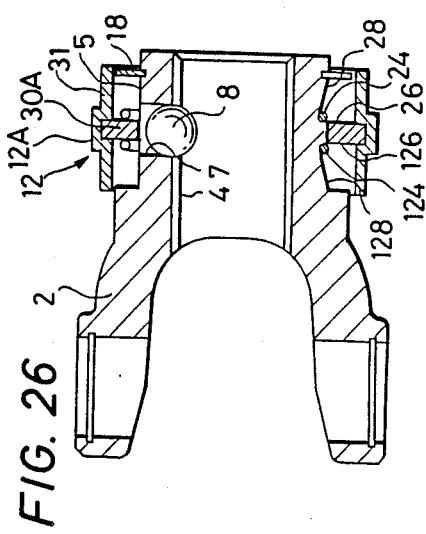
FIG. 26 is a view showing an embodiment in which the set ring is different.

Though each of the foregoing embodiments shows the set ring 12 having an integral structure, the set ring 12 may be constituted, as shown in FIG. 26, by a sleeve 12A and a protrusion 30A which are provided separately from each other and which may be made of steel, hard rubber, plastic, and the like, or any combination thereof.

Furthermore, all of the above-described embodiments show the case where the inclined surfaces 28 and 128 are respectively independently formed like a flat plane axially extending and where the spring rings 24 and 124 are respectively formed substantially triangularly so as to have three corner portions 51 and three flat portions 50. Nonetheless, various kinds of forms can be used for the inclined surfaces 28 and 128 and spring rings 24 and 124. In the following, typical examples of the forms that can be used are described but the invention is not limited thereto.

Figure 27:
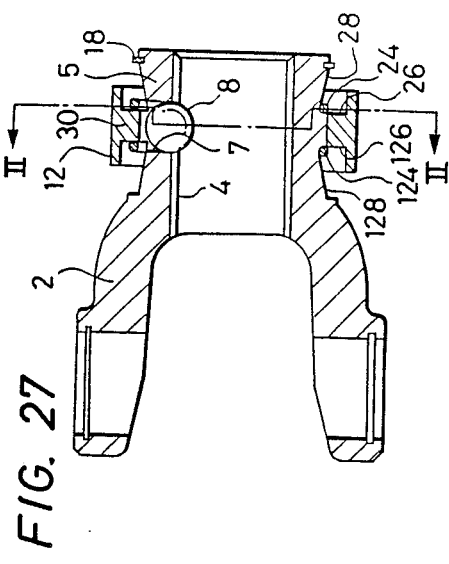
FIGS. 27 to 29 are views showing a further embodiment of the coupling device in which the inclined surfaces are formed conically, FIG. 28 being a cross-sectional view taken along the line II—II of FIG. 27, FIG. 29 being a view showing a spring ring.
Figure 29:
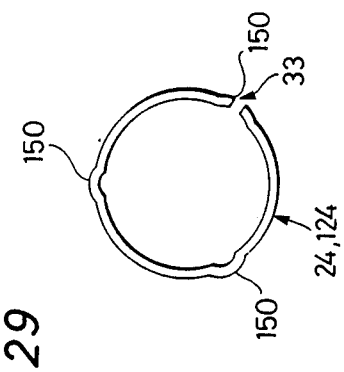
Figure 28:
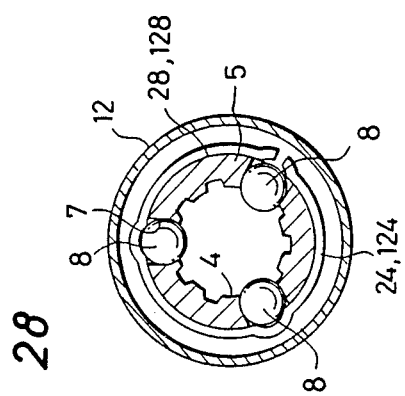

The embodiment of the coupling device shown in FIGS. 27 to 29 is similar to the foregoing embodiment shown in FIGS. 1 to 6 but differs in that inclined surfaces 28 and 128 respectively extend axially from the area of apertures 7 so as to increase the diameter of a boss member. The inclined surfaces 28 and 128 are formed as conical surfaces entirely circumferentially formed on a boss member 5 and that each of spring rings 24 and 124 is made to have a substantially circular form having a slit 33 and three dimples 150. In this case, the spring rings 24 and 124 have contracting force and are arranged to slide on the inclined surfaces 28 and 128 respectively to thereby axially keep a set ring 12 at the locked position. The dimples 150 are located on the apertures 7 of the boss member 5. Accordingly, if the set ring 12 is held by hand and axially displaced against the axial force component of one of the spring rings, the dimples 150 of the other spring ring retain the balls 8 to prevent the balls 8 from coming off.

Figure 30:
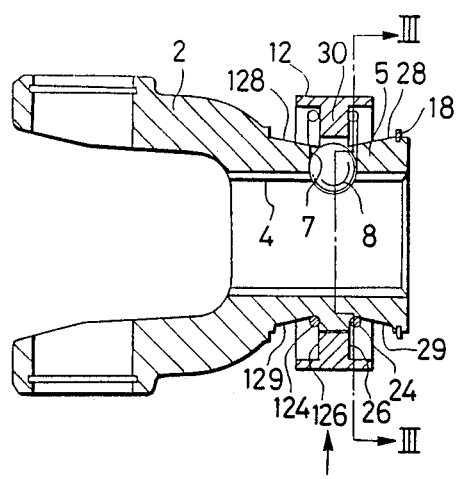
FIGS. 30 to 32 are views showing another embodiment in which conical inclined surfaces and substantially triangular spring rings are used.
Figure 31:
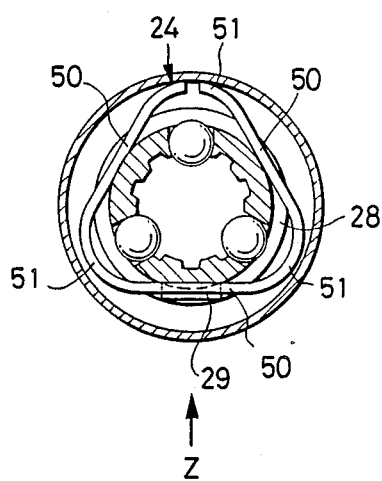
Figure 32:
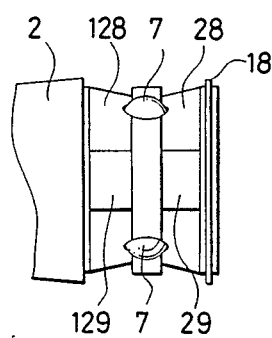

FIGS. 30 to 32 show a further embodiment of the coupling device in which the foregoing boss member 5 having the conical surfaces 28 and 128 is used in combination with the substantially triangular spring rings 28 and 128 as shown in FIG. 3. In this embodiment, it is apparent from FIGS. 31 and 32 that at least one cut surface 29 and at least one opposing cut surface 129 are respectively formed on the inclined surfaces 28 and 128 of the boss member 5. The flat portions 50 of the spring rings 28 and 128 engage with the cut surfaces 29 and 129 to thereby stop the rotation of the spring rings relative to the boss member 5. The stopping of the rotation prevents the flat portions 50 of the spring rings 24 and 124 from being located in the area of apertures 7. Having contracting force, the spring rings 24 and 124 slide on the inclined surfaces 28 and 128 and the similarly inclined cut surfaces 29 and 129 so as to be located at the lowermost portions. Consequently, the corner portions 51 of the spring rings 24 and 124 respectively come in contact with opposite side surfaces 26 and 126 of a protrusion 30 of a set ring 12.

Figure 33:
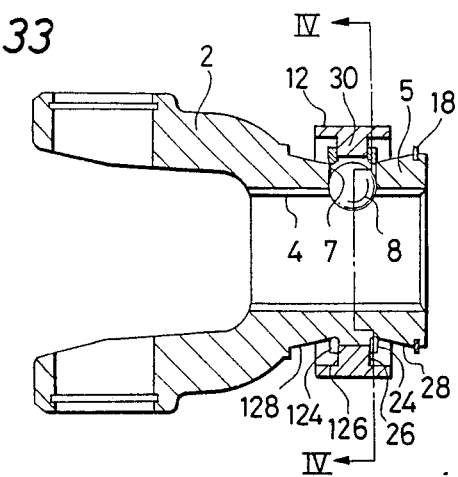
FIGS. 33 to 35 are views showing a further embodiment in which conical inclined surfaces and circular spring rings are used in combination, FIG. 34 being a cross-sectional view taken along the line IV—IV of FIG. 33, FIG. 35 being a view showing one of the spring rings.
Figure 34:
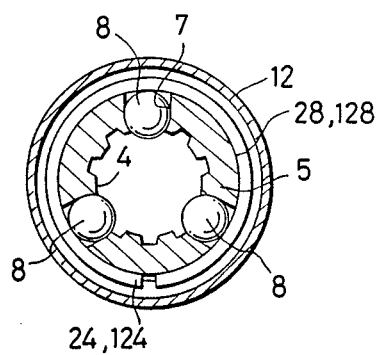
Figure 35:
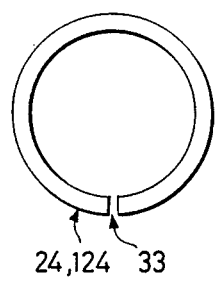

FIGS. 33 to 35 show a further embodiment of the coupling device in which conical inclined surfaces 28 and 128 and circular spring rings 24 and 124 are used in combination. Each of the spring rings 24 and 124 is made to be a circle having a slightly widened width and a slit 33. The spring rings 24 and 124 have contracting force so that they are in forced contact at their inner surfaces with the inclined surfaces 28 and 128 respectively, and they are in contact at their outer surfaces with a ball-stopper protrusion 30 of a set ring 12.

It is a matter of course that the combination of inclined surfaces and spring rings as shown in FIGS. 27 to 35 is applicable to the cases as shown in FIGS. 1 to 26.

In the following, the embodiments according to a second aspect of the invention will be described. These embodiments use only a single spring ring.

Similarly to the foregoing embodiments, the removable coupling device shown in FIGS. 36 to 39 is provided for the purpose of the connection between a splined power shaft of a tractor for driving an agricultural machine coupled with the tractor through a universal joint and a boss member having a joint yoke as the universal joint. The coupling device has a boss member 5 including a joint yoke 2 and a splined shaft 6. The boss member 5 has a hole 4 extended axially for receiving the shaft 6 in the boss member 5, and three apertures 7 extended radially and opening into the hole 4. Locking elements such as balls 8 are disposed in the respective apertures 7 and partially extend inwards from the apertures 7 to thereby be fitted in a set groove 10 formed in the shaft 6 so that the shaft 6 is prevented from coming off from the boss member 5.

On the outer surface of the boss member 5, three inclined surfaces 28 are formed so as to be circumferentially substantially equidistantly separated from each other and are circumferentially shifted by an angle of about 60 degrees relative to the respective apertures 7. Each of the inclined surfaces 28 is axially extended in the directions opposite to each other from the area of a radial plane where the center of the apertures 7 exist while increasing the diameter of the boss member toward the respective opposite end sides. The two oppositely extended inclined surface portions of each inclined surface 28 are connected to each other at the smallest-diameter portion axially separated from the area of the apertures 7 by a distance A. In this case, the outer surface portions of the boss member 5 other than the part where the inclined surfaces are formed are shaped like a circular pillar but the outer surface of the boss member 5 may be shaped like a polygonal pillar. The length, the width and the angle of inclination of the inclined surfaces 28 can be suitably selected in accordance with the conditions required.

Figure 36:
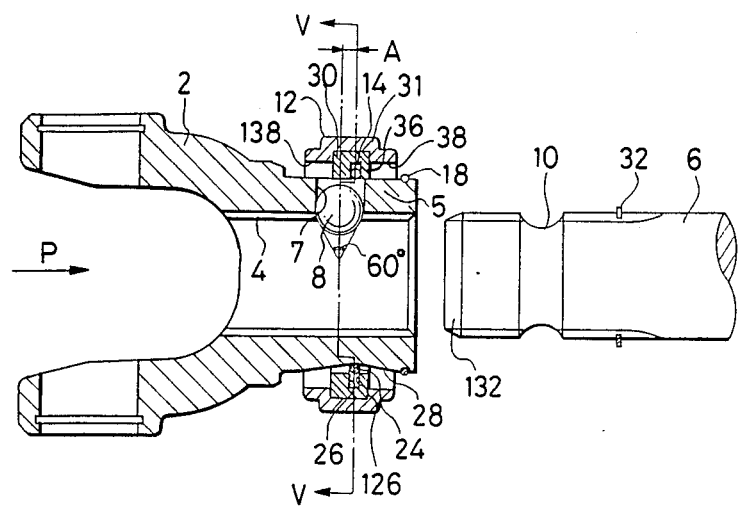
FIGS. 36 to 39 are views showing an embodiment of the coupling device in which a continuous inclined surfaces and a spring ring are used.
Figure 38:
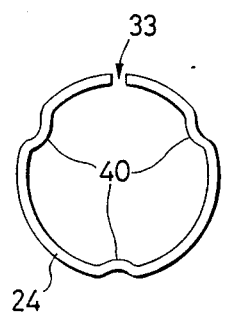

On the boss member 5, a set ring 12 is disposed to be axially movable. The set ring 12 comprises a sleeve 31 and a protrusion 30 fixed to the sleeve and extended inwards substantially at the center portion for the purpose of keeping the balls 8 at the lock position. The protrusion 30 has a groove 14 formed in a position axially shifted from the center of the apertures 7. In order to keep the set ring 12 at the position shown in FIG. 36, a single circular spring ring 24 having three concavities 40 as shown in FIG. 38 and having contracting force is disposed on the boss member 5. The concavities 40 of the spring ring 24 are in forced contact with the inclined surfaces 28 respectively, and other portions thereof are fitted in the groove 14 of the protrusion 30 of the set ring 12. The concavities 40 of the spring ring 24 are apt to slide on the inclined surfaces 28 to be located at the smallest-diameter portion of the boss member so that the set ring 12 can be kept at the lock position as shown in FIG. 36. Furthermore, a stopper 18 is formed at the end portion of the boss member 5 so as to prevent the set ring 12 and the spring ring 24 form coming off the boss member 5.

Figure 39:
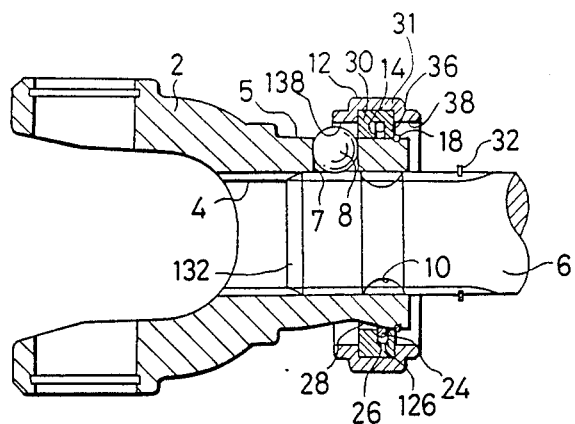

In connecting the shaft 6 to the boss member 5 as shown in FIG. 39, the set ring 12 is held by hand and is axially moved to the right in the drawing against the axial force component produced by the pressure between the spring ring 24 and the inclined surface 28. At this time, the portions other than the concavities 40 of the spring ring 24 have been fitted in the groove 14, so that the spring ring 24 is spread and carried together with the set ring 12. Thereafter, the set ring 12 is pushed in the direction of insertion to more deeply insert the shaft 6 into the hole 4 of the boss member 5 and the boss member 5 is moved together with the joint yoke 2 toward the shaft 6. In this case, the ball-stopper protrusion 30 of the set ring 12 is removed from in the area of the aperture 7, and, accordingly, the balls 8 are in a state of being movable outwards. When the shaft 6 enters into the hole 4 in this state, the balls 8 are pushed outwards by the cam function of a chamfered portion 132 provided at the forward end of the shaft 6 to thereby permit the entrance of the shaft 6. At this time, the balls 8 come in contact with an inner surface 138 of the sleeve 21 so that the balls 8 are prevented from coming off. At the connectable and disconnectable position of the set ring 12 (FIG. 39), the set ring 12 cannot return to the locked position as long as the shaft 6 reaches the area of the apertures 7, because the protrusion 30 comes in contact with the balls 8 even if the hold of the set ring 12 by hand is released. However, when the set groove 10 of the shaft 6 reaches the apertures 7, the concavities 40 of the set ring 24 slides on the inclined surfaces 28 and the balls 8 are pressed inwards by the protrusion 30 of the set ring 12 so as to be partially fitted into the set groove 10. Accordingly, the set ring 12 automatically returns to the lock position, so that the shaft 6 is prevented from removing from the hole 4 of the boss member 5. In this case, the spring ring 24 slides to the smallest-diameter portion which is the joint portion of the respective inclined surfaces 28, so that the set ring 12 can be stably kept at the locked position. In removing the shaft 6 from the boss member 5, a reversed operation is made. That is to say, the set ring 12 is axially moved to the left and the boss member 5 is removed from the boss member 5. At this time, the balls 8 move outwards but come in contact with the inner surface 38 of the sleeve 31. Accordingly, the balls 8 are prevented from coming off. When the boss member 5 is separated from the shaft 6, the set ring 12 automatically returns to the lock position.

Figure 37:
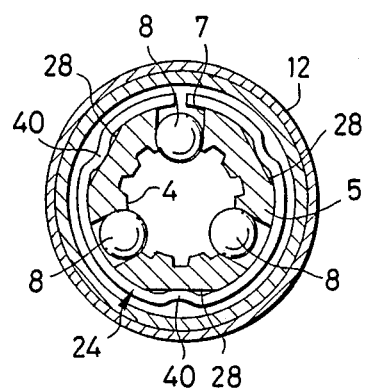

Although FIG. 37 shows, in a cross-sectional view taken along the section line V—V of FIG. 36, the arrangement of the inclined surfaces 28 and the apertures 7, it is a matter of course that the number of the inclined surfaces and the shape of the outer surface of the boss member can be suitably selected and modified. For example, four inclined surfaces and a hexagonal boss member may be provided. Although FIG. 38 is a detailed drawing of the spring ring 24, the shape of the spring ring, the number of the concavities 40 of the spring ring, and the like, may be suitably modified corresponding to the boss member and the inclined surfaces. Any of the various kinds of forms defined in the first aspect of the invention are applicable to the spring rings 24 and 124 according to the second aspect of the invention. Reversely, any of the forms of the spring rings disclosed according to the second aspect of the invention are applicable to the spring rings according to the first aspect of the invention.

Figure 40:
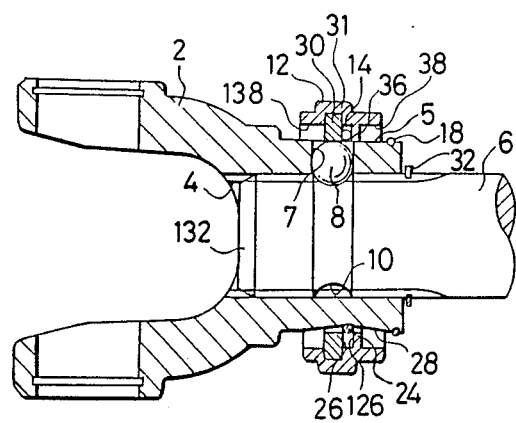
FIG. 40 is a view showing another embodiment in which the protrusion of the set ring is separately formed.
Figure 41:
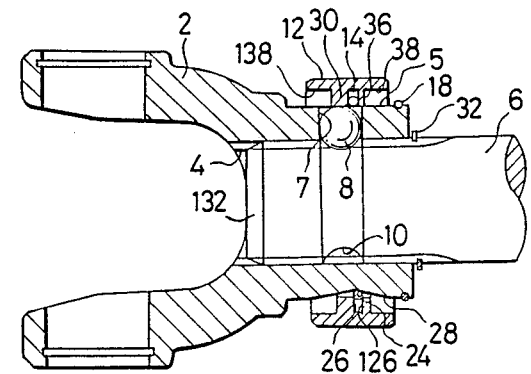
FIG. 41 is a view showing a further embodiment in which the protrusion is formed integrally with the sleeve.

The embodiments of the coupling device shown in FIGS. 40 and 41 are similar to the embodiment described directly above. The embodiment of FIG. 40 is different in that a set ring 12 comprises a sleeve 31 and a protrusion 30 which are formed separately from each other. The sleeve 31 has an inwards projecting salient 36 to thereby form a groove 14 between the protrusion 30 and the salient 36. The embodiment of FIG. 41 is different in that a set ring 12 comprises a protrusion 30 acting as a ball stopper and a sleeve 31 integrally formed with the protrusion 30. The protrusion 30 is provided with a groove 14.

Figure 42:
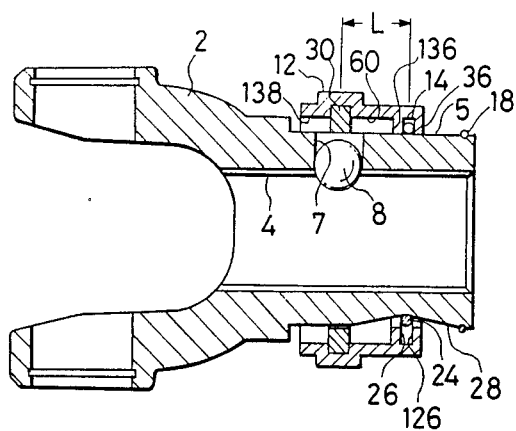
FIGS. 42 to 45 are views showing embodiments in which the inclined surfaces are formed at different places on the boss member.

FIG. 42 shows a modification of the coupling device shown in FIGS. 36 to 39. This modification is different in that three inclined surfaces 28 linked at the smallest-diameter portion are disposed at a portion axially apart from the area of apertures 7 by a distance L. Accordingly, a set ring 12 is axially extended, and a groove 14 in which a spring ring 24 is fitted is formed in the extended portion of the set ring 12. Between a portion including the groove 14 and a protrusion 30, a recess 60 is formed for receiving balls 8 at the connectable and disconnectable position. The protrusion 30 is arranged to be located in the area of the apertures 7.

Figure 43:
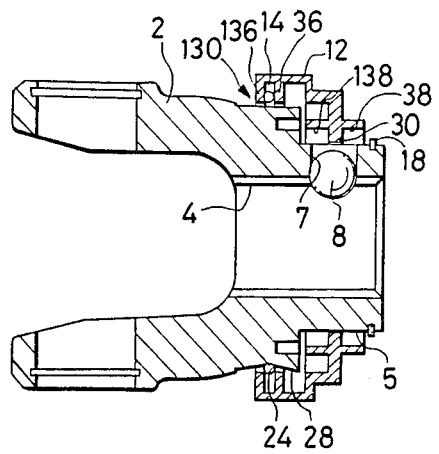

FIG. 43 shows an embodiment in which inclined surfaces 28 are disposed at a portion of the outer surface of the boss member 5 increased in diameter at a joint yoke 2 side and in which a set ring 12 is similarly extended to the inclined surfaces 28 and provided with a flange 130 extending inwards to the inclined surfaces 28. The flange 130 is provided with a groove 14 for receiving portions of a spring ring 24 other than its concavities 40, the spring ring 24 being in forced contact with the inclined surfaces 28.

Figure 44:
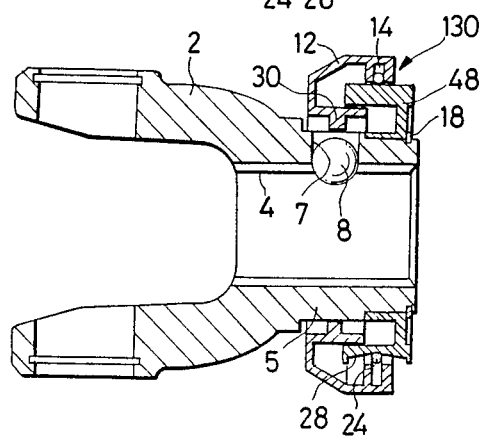
Figure 45:
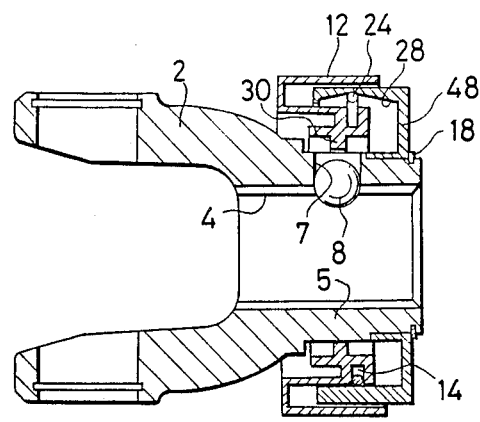

FIGS. 44 and 45 show further embodiments in which inclined surfaces 28 are formed on a member 48 integrally attached to a boss member 5. In FIG. 44, the inclined surfaces 28 are formed on the outer surface of an annular member 48 being U-shaped in section; a set ring 12 is extended to the area of the inclined surfaces 28 and has a flange 130 formed at the extended portion; and the flange 130 is provided with a groove 14 for receiving portions of the spring ring other than its concavities 40, which are in forced contact with the inclined surfaces 28.

In FIG. 45, inclined surfaces 28 are disposed on the inner surface of an annular member 48 similarly to those shown in FIG. 44. In this embodiment, a spring ring 24 having spreading force is used. Portions of the spring ring 24 other than its concavities 40 are in forced contact with the inclined surfaces 28, and the concavities 40 are fitted in a groove 14 provided in the outer surface of the set ring 12. In these two foregoing embodiments, the spring ring 24 has contracting force or spreading force respectively, and accordingly, the set ring 12 is axially kept at the locked position through the groove 14 by the cam function of sliding down to the lowermost portion on the inclined surfaces 28.

Figure 46:
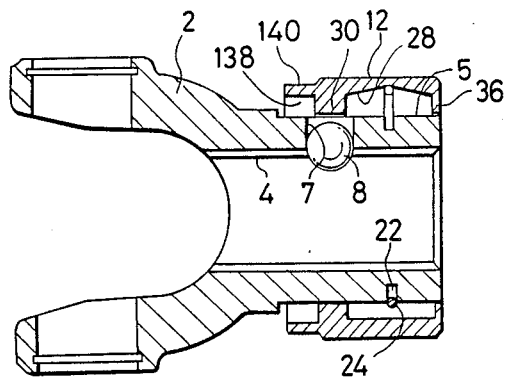
FIGS. 46 and 47 are views showing another embodiment in which the inclined surfaces formed on the inner surface of the set ring.
Figure 47:
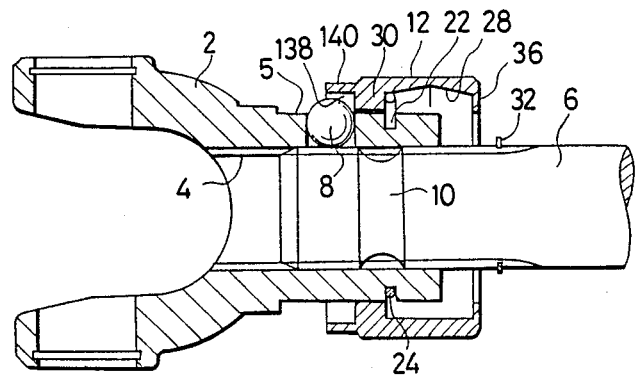

In the following, description will be made as to further embodiments in which inclined surfaces 28 are formed on a set ring 12. In the embodiment of FIGS. 46 and 47, the inclined surfaces 28 are formed on the inner surface of the set ring 12 apart from the area of apertures 7. A spring ring 24 having spreading force is in forced contact with the inclined surfaces 28. Concavities 40 of the spring ring are fitted in a groove 22 formed in a boss member 5. A protrusion 30 of the set ring 12 exists in the area of the apertures and has a flange 140 axially extending toward the direction opposite to the inclined surfaces 28. FIG. 47 shows a condition that the shaft 6 is inserted into the hole 4 of the boss member 5. Being pressed by the shaft 6 to move outwards, the balls 8 are prevented from coming off because the balls 8 are in contact with the inner surface of the flange 140.

Figure 48:
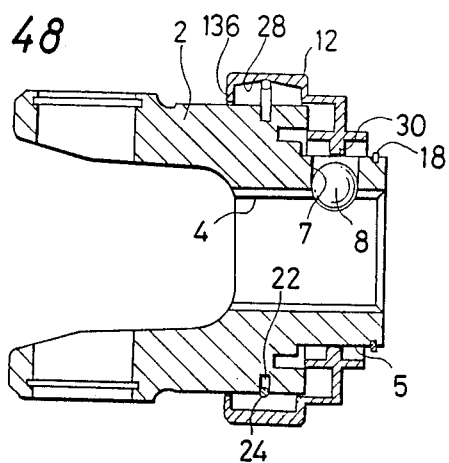
FIGS. 48 and 49 are views showing embodiments in which the inclined surfaces are formed at different places on the set ring.

FIG. 48 shows an embodiment in which inclined surfaces 28 are formed on the inner surface of a set ring 12 which is extended to a portion of a joint yoke 2 outside the boss member 5 where the diameter is increased and where a groove 22 is provided on the outer surface of the boss member 5 corresponding to inclined surfaces 28. In this case, a spring ring 24 is the same as that used in the preceding embodiment.

Figure 49:
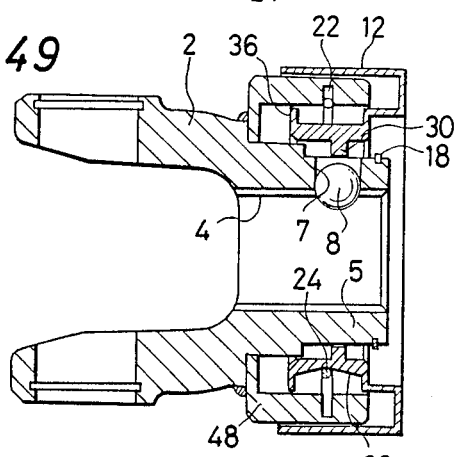

FIG. 49 shows another embodiment in which inclined surfaces 28 are formed on the outer surface of a set ring 12 having contracting force. In this embodiment, concavities 40 of a spring ring 24 are in forced contact with the inclined surfaces 28, and the other portions of the spring ring 24 are fitted in a groove 22 formed in the inner surface of an annular member 48 integrally attached to a boss member 5 which is extended to the area of the inclined surfaces.

Although the embodiments of FIGS. 36 to 49 show the case where three inclined surfaces 28 are formed at circumferentially equal intervals and where such a spring ring 24 as shown in FIG. 38 is used, it is a matter of course that the inclined surfaces may be conically shaped as shown in FIG. 35 and that different spring rings may be used in combination. All the arrangements as shown in FIGS. 26 to 35 are applicable to the embodiments of FIGS. 36 to 49.

In the following, embodiments according to a third aspect of the invention will be described.

Figure 50:
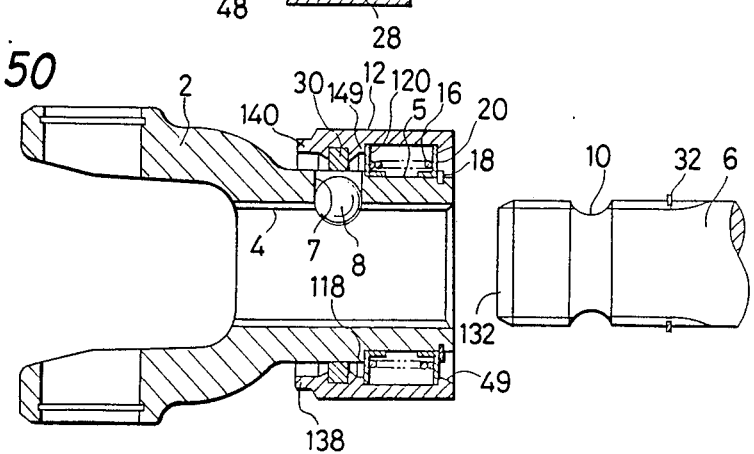

FIGS. 50 and 51 show a modification of the embodiment of FIGS. 46 and 47. In short, the combination of the inclined surfaces 28 and the single spring ring 24 used in the embodiments according to the second aspect of the invention is replaced by a combination of a compression coiled spring and two spring supports in the embodiment according to the third aspect of the invention. In FIGS. 50 and 51, a compression coiled spring 16 is disposed between spring supports 20 and 120. One spring support 20 is supported by a stopper 18 provided on a boss member 5 and the other spring support 120 positioned by a stopper 118 of the boss member 5 and is also engaged with a flange 149 formed on the inner surface of a set ring 12. Furthermore, a flange 49 engaged by the spring support 20 is formed on the inner surface of a cylindrical portion of the set ring 12. Accordingly, the set ring 12 is axially pressed by the compression coiled spring 16 so that the spring support 120 is engaged with the stopper 118 on the boss member 5 to limit the axial sliding of the set ring 12 to thereby position a ball-stopper protrusion 30 in the area of the aperture 7. Thus, the set ring 12 is kept at the locked position.

FIG. 51 is a diagram showing the operational process which corresponds to the drawing of the boss member 5 of FIG. 47 of the previous embodiment. The set ring 12 is moved toward the splined shaft, that is, to the right in FIG. 50, against the force of the compression coiled spring 16. In this position, the ball-stopper protrusion 30 of the set ring 12 is far from the balls 8, so that the splined shaft 6 is inserted and the balls 8 moves outward.

Because the spring support 120 is engaged with the flange 149 of the set ring 12, the spring ring 120 moves right in FIG. 50 together with the set ring 12. In this case, the set balls 8 are prevented from coming off by the inner surface 138 of the flange 140.

When the hold of the set ring 12 by hand is released under this condition, the set ring 12 is slightly moved left in FIG. 51 by the returning force of the compression coiled spring 16 but cannot be moved any more because the ball stopper protrusion 30 of the set ring 12 is engaged with the set balls 8 pressed outward by the splined shaft 6. When the shaft is more deeply inserted into the hole 4, the groove 10 of the shaft 6 reaches to the area of the apertures 7, and thereafter the balls 8 are pressed by the protrusion 30 of the set ring 12 and moved inwards to be fitted into the groove 10. At this time, the set ring 12 moves left and automatically returns to the lock position. Reversely, the boss member 5 can be removed from the splined shaft 6 if the set ring 12 is moved to left in FIG. 50 against the force of the compression coiled spring 16. At this time, the spring support 20 is moved left together with the set ring 12 because the spring support 20 is engaged with the flange 49 of the set ring 12. Other construction and operations are the same manner as the embodiments according to the second aspect of the invention, and description thereof will be omitted.

The spring supports 20 and 120 may be made of a steel material by press forming or made of a plastic material. In place of the compression coiled spring 16, any kind of well known compression spring such as a plate spring, a wavy spring or the like may be employed. Furthermore, it is a matter of course that an tension spring may be used in substitution for the compression spring.

FIGS. 52 to 54 shows a modification of the coupling device shown in FIGS. 1 to 6. In this embodiment, inclined surfaces 28 respectively extending from the area of the apertures 7 are formed at a one side of the apertures 7. The inclined surfaces 28 are formed substantially at circumferentially equal intervals so as to be circumferentially shifted from the apertures 7. Grooves 128A which are to be engaged by flat portions 5 of the spring ring 124 are formed in the outer surface of the boss member 5 at a portion axially far from the inclined surfaces 28 on the side of the apertures 7 opposite to the inclined surfaces 28. In connecting and disconnecting the boss member 5 to and from the shaft 6, the set ring 12 is moved to the direction opposite to the splined shaft as shown in FIG. 53, or in other words the set ring 12 is moved left in FIG. 52 against the force of the spring ring 24 to be turned to the connectable and disconnectable position, and the protrusion 30 is moved out of the area of the aperture 7 to make the balls 8 movable radially outwards. In this case, as shown in FIG. 53, the balls 8 are prevented from coming off even if the shaft 6 is inserted to move the ball 8 radially outwards, because the corner portions 51 of the spring ring 24 come in contact with the balls 8. Other operations are the same as those described above and description thereof will be omitted. Although not shown in the drawing, it is a matter of course that the same effect as the modification described directly above can be expected even if the embodiment of FIGS. 36 to 39 in which each of the inclined surfaces 28 has two inclined surfaces axially extending to the opposite sides from the area of the apertures 7 is modified such that only any one of the two inclined surface portions is formed at one side as the respective inclined surface 28. For example, it is apparent that the modifications in which the single-sided inclined surfaces are applied to the embodiments shown in FIGS. 1 to 51 are applicable to the prior art type devices in which the set ring 12 is required to be moved in the direction opposite to the movement direction of the boss member 5 at the time of connection/disconnection.

Figure 55:
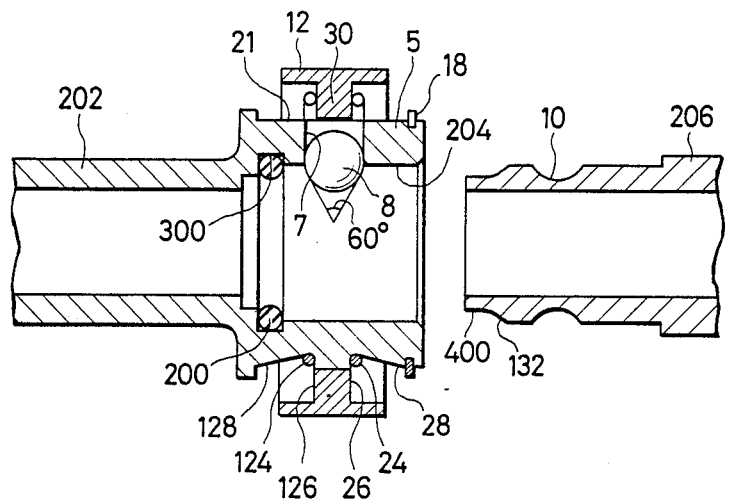
FIGS. 55 and 56 are views showing another modification of FIGS. 1 to 6 which are applied to the connection of pipes.
Figure 56:
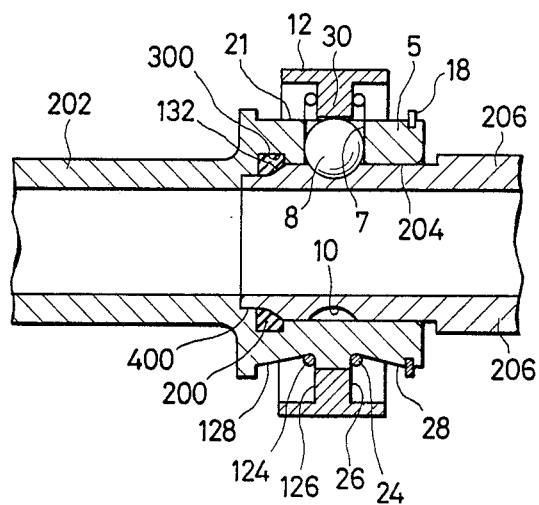

FIGS. 55 and 56 show a modification of the coupling device shown in FIGS. 1 to 6, as an example in which the invention is applied to the connection of pipes such as fire hoses or the like. FIG. 55 corresponds to FIG. 1, and FIG. 56 corresponds to FIG. 5. The modification is different from the embodiment shown in FIGS. 1 to 6 in that the joint yoke 2 is replaced by a female pipe 202; the splined hole 4 is replaced by a non-splined hole 204, and the shaft 6 is replaced by a male pipe 206; and a groove 300 is formed in the inner surface of the boss member 5 so as to dispose a seal 200 in the groove 300 so that the seal 200 is surrounded by and urged against a chamfered portion 132 and a small-diameter portion 400 of the male pipe 206 and the inner surface groove 300 of the boss member 5 under the connecting condition to thereby prevent fluid leakage.

The other arrangement, connecting and disconnecting procedure, and operations are the same as those described above, and description thereof will be omitted.

From the description made above, it is apparent that all the embodiments of the present invention are applicable to the connection of pipes.

Figure 57:
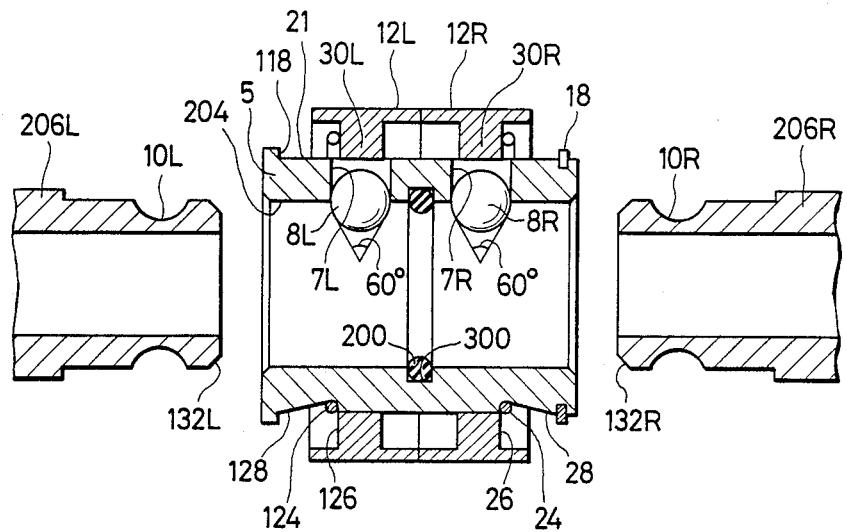
FIGS. 57 and 58 are views showing a modifications of FIGS. 55 and 56.
Figure 58:
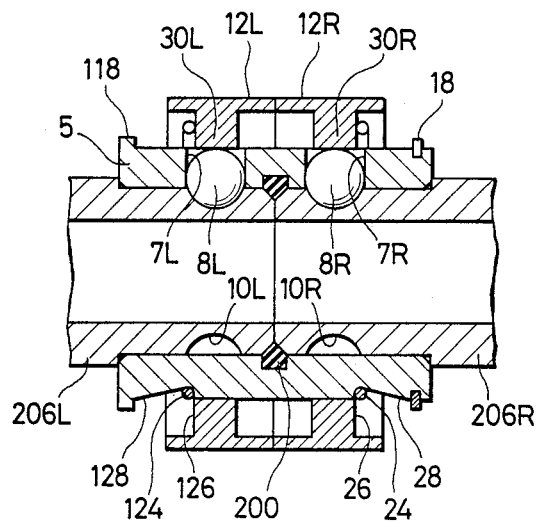

FIGS. 57 and 58 shows another modification of the embodiment described directly above.

This modification is different from the embodiment shown in FIGS. 55 and 56 in that in place of the apertures 7, the balls 8, and the set ring 12, there are provided a pair of apertures 7R and 7L, a pair of balls 8R and 8L, a pair of set rings 12R and 12L, and a pair of ball stopper protrusions 30R and 30L. Two independent inclined surfaces 28 and 128 are formed on the boss member 5 on the opposite sides of the apertures 7R and 7L and at the side ends facing the male pipes 206R and 206L. Spring rings 24 and 124 are disposed so as to be in forced contact with the inclined surfaces 28 and 128 respectively. The spring ring 24 which is in forced contact with the inclined surface 28 abuts on an outer side surface 26 of the protrusion 30R of the set ring 12R, and the other spring ring 124 which is in forced contact with the inclined surface 128 abuts on an outer side surface 126 of the protrusion 30L of the set ring 12L. The connection and disconnection of the boss member 5 to and from the right pipe 206R can be made by holding the right set ring 12R by hand, and on the other hand, the connection and disconnection of the boss member 5 to and from the left pipe 206L can be made by holding the left set ring 12L by hand. The other arrangements, connecting/disconnecting procedure, and operations are the same as those described above, and description thereof will be omitted. Thus, the two male pipes 206R and 206L can be connected and disconnected to and from one boss member 5. In this embodiment, a seal 200 is surrounded by and in forced contact with a pair of chamfered portions 132R and 132L of the male pipes 206 and 206L and a groove 300 formed in the inner surface of the boss member 5 under the connecting condition, thereby preventing fluid leakage.

It is apparent that this device is useful as an attachment for connecting two male pipes of the same form. The advantage of this device exists in that it can be used for various purposes compared to the above embodiment requiring two kinds of pipes as shown in FIGS. 57 and 58.

Figure 59:
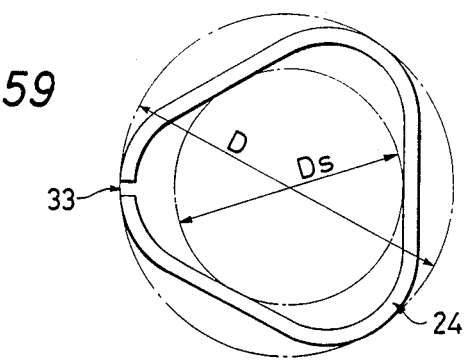
FIGS. 59, 60A, 60B, 60C, 61A, 61B and 61C are views for explaining the spring ring.
Figure 60A:
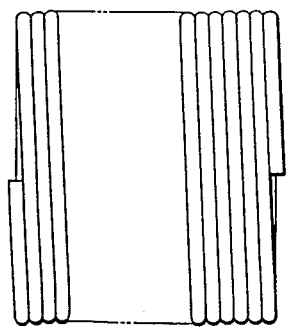
Figure 60B:
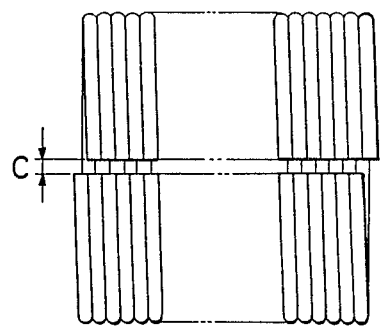
Figure 60C:
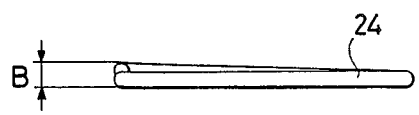

In the following, the substantially triangular spring ring having contracting force or spreading force and used in the foregoing embodiments, will be described in detail. If the spring ring 24 shown in FIG. 59 is disposed onto the inclined surface of the boss member or of the set ring having an external diameter which is larger than the internal diameter Ds of the spring ring in its free state or connectable and disconnectable condition, the spring ring 24 has radially contracting force. On the contrary, if the spring ring 24 shown in FIG. 59 is disposed onto the inclined surface of the boss member or of the set ring having an externl diameter which is smaller than the internal diameter D of the spring ring in its free state or connectable/disconnectable condition, the spring ring 24 has radially spreading force. In either event, the spring ring may have axially spreading force as will be described later. The spring ring 24 is formed in the form of an annular spring having a slit 33. The annular spring of this type is produced by the steps of winding a wire rod on a base, such as a triangular, a polyangular or a circular base, in such a manner as shown in FIG. 60A and machining a slit as shown by the symbol C in the drawing of FIG. 60B. In this case, the shape of cross section of the wire rod is not limited to be circular, but any shape can be suitably selected. Accordingly, such a spring ring as having an axially staggered slit as shown by the symbol B in FIG. 60C can be manufactured, and, furthermore, the degree of the axial staggering can be suitably selected. If such a spring ring 24 is inserted into the groove 14 of the set ring 12 in the embodiments as shown in FIGS. 36 to 49, the spring ring has spreading force in the axial direction because the width of the groove 14 is smaller than the width B of the spring ring 24. Furthermore, if such a spring ring 24 is assembled together with the set ring 12 into the boss member 5 while spreading the spring ring 24, the spring ring has radially contracting force because the internal diameter Ds of the spring ring 24 in the free state or connectable and disconnectable condition is smaller than the minimum diameter of the boss member 5 a the inclined surface 28. Accordingly, the spring ring 24 can be to exactly and stably fit in the groove 14 of the set ring 12 to thereby be kept in such a state that the spring ring cannot axially move on the boss member 5. Accordingly, noise and abrasion owing to shock and vibrations can be prevented from occurring.

Figure 61A:
Figure 61B:
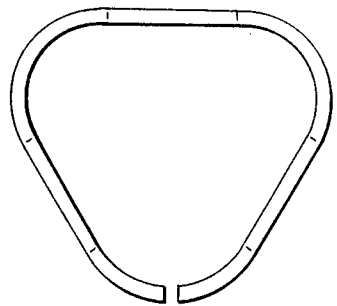
Figure 61C:
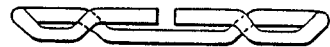

In order to secure the radial and axial force of the spring ring 24, the spring ring may be formed as shown in FIG. 61C by winding such a wavy wire rod as shown in FIG. 61A or by pressing a wound wire rod as shown in FIG. 61B. In this case, more preferably, the spring ring can more smoothly slide on the inclined surface and the boss member with no instability.

Because the coupling device according to the present invention has a small number of parts and is simple in structure, manufacturing and assembling thereof can be simplified and connecting and disconnecting of the shaft can be made safely, speedily and securely. Furthermore, at the time of practical use of the device, the shaft can be easily connected to or disconnected from the boss member by the simple operation of holding the set ring by hand and moving the set ring in the direction for inserting the shaft into the hole of the boss member or for removing the shaft therefrom. Accordingly, because the connecting and disconnecting operation can be made by moving the set ring in the same direction as the movement direction of the boss member at the time of moving the boss member to insert/remove the shaft into/from the hole thereof, the device of the present invention requires nothing but such a simple operation and is excellent from view of human-factors engineering compared with the prior art type device requiring the set ring to be moved in the direction opposite to the movement direction of the boss member.

What is claimed is:

1. A removable coupling device, comprising:
   a boss member having a hole extending axially inwardly and apertures extending and opening into said hole;
   a cylindrical member having a set groove circumferentially extending in an outer surface thereof and being fittable into said hole of said boss member;
   locking elements disposed and radially movable within said respective apertures such that said locking elements can be located at a first position where said locking elements can extend inwardly from said apertures so as to engage said set groove of said cylindrical member and a second position where said locking elements are disengaged from said set groove;
   a set ring disposed on said boss member for axial movement between a locking position, for engaging said locking elements at said first position, and two connectable and disconnectable positions, for permitting movement of said locking elements to said second position; and
   means for axially biasing said set ring so as to normally keep said set ring at said locking position, and away from either of said connectable and disconnectable positions, said means for axially biasing comprising two independent oppositely inclined surfaces formed on a first one of said boss member and said set ring, and at least one spring ring partially abutting an axial surface of a second one of said boss member and said set ring and in forced contact with at least one of said inclined surfaces, whereby said at least one spring ring automatically return said set ring from either of said connectable and disconnectable positions to said locking position,
   wherein said two connectable and disconnectable positions are disposed on opposite axial sides of said locking position.

2. A removable coupling device as recited in claim 1, wherein said means for axially biasing comprises;
   two spring supports axially slidable on said boss member and a compression coil spring contacting at opposed ends thereof both of said spring supports;
   two stoppers formed on an outer surface of said boss member to limit an axial movement of respective ones of said spring supports in two oppoesd directions; and
   two flanges formed on said set ring to limit said axial movement of respective ones of said spring supports in said two opposed directions.

3. A removable coupling device, comprising:
   a boss member having a hole extending axially inwardly and apertures extending radially and opening into said hole;
   a cylindrical member having a set groove extending circumferentially in an outer surface thereof and being fitted into said hole of said boss member;
   locking elements disposed within said respective apertures for radial movement such that said locking elements can be located at one of a locking position where said locking elements can extend inwardly from said aperture so as to engage said set groove of said cylindrical member and a connectable and disconnectable position where said locking elements are disengaged from said set grooves;
   a set ring disposed on said boss member for axial movement, said set ring being axially urged by spring force so as to normally keep said locking elements at said locking position;
   two inclined surfaces with inclinations which are different and independent of each other, said inclined surfaces being formed on at least one of an outer surface of said boss member and a surface of said set ring so as to increase a diameter of a respective one of said boss member and said set ring as said inclined surfaces axially extend, wherein said surface of said set ring is one of an inner surface and an outer surface thereof;
   two spring rings partially abutting at least one of a portion of said set ring having no inclined surface and side surfaces of a part formed on said boss member, wherein said part formed on said boss member comprises one of a protrusion, a flange, and a stopper, said two spring rings being in forced contact with said inclined surfaces respectively, whereby one of said spring rings slides on said inclined surfaces so that said set ring is automatically returned from said connectable and disconnectable position to said locking position when said shaft is inserted into or removed from said hole of said boss member.

4. A removable coupling device according to claim 3, in which said inclined surfaces are formed on the outer surface of the boss member so as to incline to thereby increase the diameter as said inclined surfaces extend toward a radial plane along which said apertures exist, and in which said spring rings are disposed on said inclined surfaces such that said spring rings respectively partially abut on opposite side surfaces of a protrusion of said set ring, each of said spring rings having contracting force.

5. A removable coupling device according to claim 3, in which said inclined surfaces are formed on the outer surface of said boss member so as to incline to decrease the diameter as said inclined surfaces extend from a radial plane along which said apertures exist, and in which said spring rings are disposed on said inclined surfaces such that said spring rings respectively partially abut on opposite side surfaces of a flange of said set ring, each of said spring rings having contracting force.

6. A removable coupling device according to claim 3, in which said inclined surfaces are formed on the inner surface of said set ring so as to incline to increase the diameter as said inclined surfaces extend toward a radial plane along which said apertures exist, and in which said spring rings are disposed on said inclined surfaces such that said spring rings respectively partially abut on opposite side surfaces of a flange of said set ring, each of said spring rings having spreading force.

7. A removable coupling device according to claim 3, in which said inclined surfaces are formed on the inner surface of said set ring so as to incline to decrease the diameter as said inclined surfaces extend toward a radial plane along which said apertures exist, and in which said spring rings are disposed on said inclined surfaces such that said spring rings respectively partially abut on opposite side surfaces of a stopper of said boss member, each of said spring rings having spreading force.

8. A removable coupling device according to claim 3, in which said inclined surfaces are formed on the outer surface of said set ring so as to incline to decrease or increase the diameter as said inclined surfaces extend toward a radial plane along which said apertures exist, and in which said spring rings are disposed on said inclined surfaces such that said spring rings respectively partially abut on opposite side surfaces of a flange or a stopper of an annular member integrally fixed to said boss member, each of said spring rings having contracting force.

9. A removable coupling device, comprising:
a boss member having a hole axially extending inwards and apertures radially extending to be opened in said hole;
a shaft having a set groove circumferentially extending in an outer surface thereof and being fitted in said hole of said boss member;
locking elements respectively radially movably disposed within said apertures such that said locking elements can be located at one of a locking position where said locking elements can partly extend inwards from said apertures so as to engage with said set groove of said shaft and a connectable and disconnectable position where said locking elements are disengaged from said set groove;
a set ring axially movable between a first position for keeping said locking elements at said locking position and second positions for allowing said locking elements to move between said locking position and said connectable and disconnectable position;
inclined surfaces are formed on an outer surface of said boss member or on an inner or outer surface of said set ring such that each of said inclined surfaces has two inclined surface points connected to each other at a minimum or maximum diameter portion so that the diameter is increased or decreased as said two inclined surface points extend toward opposite ends from said minimum or maximum diameter portion; and
a spring ring partially engaging with a groove formed in an inner or outer surface of said set ring having no inclined surface or formed in an outer surface of said boss member, said spring ring being in forced contact with said inclined surface, the engagement between said groove and said spring ring being adapted for biasing said spring ring for slidable movement on and relative to said inclined surfaces so that said set ring is automatically returned from one of said second positions to said first position when said shaft is inserted into or removed from said hole of said boss member.

10. A removable coupling device according to claim 9, in which said groove is formed in the inner surface of said set ring, said inclined surfaces are formed on the outer surface of said boss member so as to incline to decrease the diameter as said inclined surfaces extend axially toward a radial plane along which said apertures exist, and said spring ring is disposed on said inclined surface such that said spring ring partially engages with said groove formed in the inner surface of said set ring said spring ring having contracting force.

11. A removable coupling device according to claim 9, in which said groove is formed in the outer surface of said boss member, said inclined surfaces are formed on the inner surface of said set ring as to incline to increase the diameter as said inclined surfaces extend axialy toward a radial plane along which said apertures exist, and said spring ring is disposed on said inclined surfaces such that said spring ring partially engages with said groove formed in the outer surface of said boss member, said spring ring having spreading force.

12. A removable coupling device according to claim 9, in which said groove is formed in the inner surface of an annular member integrally fixed to said boss member, said inclined surfaces are formed on the outer surface of said set ring so as to incline to increase the diameter as said inclined surfaces extend axially toward a radial plane along which said apertures exist, and said spring ring is disposed on said inclined surfaces, such that said spring ring partially engages with said groove, said spring ring having contracting force.

13. A removable coupling device according to claim 4, in which said inclined surfaces are disposed at a position axially separated by a distance L from an area of said aperture.

14. A removable coupling device according to claim 5, in which said inclined surfaces are disposed at a position axially separated by a distance L from an area of said aperture.

15. A removable coupling device according to claim 6, in which said inclined surfaces are disposed at a position axially separated by a distance L from an area of said aperture.

16. A removable coupling device according to claim 7, in which said inclined surfaces are disposed at a position axially separated by a distance L from an area of said aperture.

17. A removable coupling device according to claim 4, in which said inclined surfaces are formed on the outer surface at an enlarged diameter portion of said boss member on a joint yoke side or formed on the inner surface of said set ring extended to said enlarged diameter portion.

18. A removable coupling device according to claim 5, in which said inclined surfaces are formed on the outer surface at an enlarged diameter portion of said boss member on a joint yoke side or formed on the inner surface of said set ring extended to said enlarged diameter portion.

19. A removable coupling device according to claim 6, in which said inclined surfaces are formed on the outer surface at an enlarged diameter portion of said boss member on a joint yoke side or formed on the inner surface of said set ring extended to said enlarged diameter portion.

20. A removable coupling device according to claim 7, in which said inclined surfaces are formed on the outer surface at an enlarged diameter portion of said boss member on a joint yoke side or formed on the inner surface of said set ring extended to said enlarged diameter portion.

21. A removable coupling device according to claim 4, in which said inclined surfaces are formed on the inner or outer surface of an annular member integrally fixed to said boss member.

22. A removable coupling device according to claim 5, in which said inclined surfaces are formed on the inner or outer surface of an annular member integrally fixed to said boss member.

23. A removable coupling device according to claim 10, in which said inclined surfaces are formed on the inner or outer surface of an annular member integrally fixed to said boss member.

24. A removable coupling device according to claim 3, in which said inclined surfaces are formed entirely circumferentially conically.

25. A removable coupling device according to claim 24, in which said spring ring or each of said spring rings is formed to be a polygon, and in which each of said inclined surfaces is formed to be a conical surface surrounding an entire circumference and being provided with at least one cut surface formed at least one portion on said inclined surface in parallel thereto so as to be engaged by flat portions or concavities of said spring ring.

26. A removable coupling device according to claim 9, in which said inclined surfaces are formed entirely circumferentially conically.

27. A removable coupling device according to claim 26, in which said spring ring or each of said spring rings is formed to be a polygon, and in which each of said inclined surfaces is formed to be a conical surface surrounding an entire circumference and being provided with at least one cut surface formed at least one portion on said inclined surface in parallel thereto so as to be engaged by flat portions or concavities of said spring ring.

28. A removable coupling device according to claim 3, in which said boss member is formed to be a cylindrical or polygonal pillar having at least two circumferentially formed inclined surfaces.

29. A removable coupling device according to claim 9, in which said boss member is formed to be a cylindrical or polygonal pillar having at least two circumferentially formed inclined surfaces.

30. A removable coupling device according to claim 3, in which each of said inclined surfaces extends from the area of said apertures of said boss member.

31. A removable coupling device according to claim 9, in which each of said inclined surfaces extends from the area of said apertures of said boss member.

32. A removable coupling device according to claim 3, in which each said spring ring is formed to be a substantially circular shape having a slit and at least two depressions comprising at least one of dimples and concavities.

33. A removable coupling device according to claim 9, in which each said spring ring is formed to be a substantially circular shape having a slit and at least two dimples or concavities.

34. A removable coupling device according to claim 3, in which each said spring ring has a slit, flat portions and corner portions corresponding in number to said flat portions.

35. A removable coupling device according to claim 9, in which each said spring ring has a slit, flat portions and corner portions corresponding in number to said flat portions.

36. A removable coupling device according to claim 9, in which said spring ring is formed to be a polygon or a circle having a slit, and in which opposite ends of said spring ring at said slit are staggered in width larger than the width of said groove of said set ring or said groove of said boss member.

37. A removable coupling device according to claim 3, in which said spring ring is wavily bent.

38. A removable coupling device according to claim 9, in which said spring ring is wavily bent.

39. A removable coupling device according to claim 3, in which said set ring is constituted by a protrusion for radially supporting said locking elements respectively received within said apertures at said locking position where said locking elements engage with said groove of said shaft, and a sleeve formed separately from said protrusion and for holding said protrusion.

40. A removable coupling device according to claim 9, in which said set ring is constituted by a protrusion for radially supporting said locking elements respectively received within said apertures at said locking position where said locking elements engage with said groove of said shaft, and a sleeve formed separately from said protrusion and for holding said protrusion.

41. A removable coupling deivce according to claim 1, wherein said means for axially biasing includes at least one spring ring.

* * * * *